United States Patent
Yerramalli et al.

(10) Patent No.: US 11,528,629 B1
(45) Date of Patent: Dec. 13, 2022

(54) BANDWIDTH PART (BWP) CONFIGURATION FOR POSITIONING IN AN INACTIVE STATE

(71) Applicant: QUALCOMM Incorporated, San Diego, CA (US)

(72) Inventors: Srinivas Yerramalli, San Diego, CA (US); Alexandros Manolakos, Escondido, CA (US); Sony Akkarakaran, Poway, CA (US); Linhai He, San Diego, CA (US); Sven Fischer, Nuremberg (DE); Jing Lei, San Diego, CA (US); Ruiming Zheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/671,404

(22) Filed: Feb. 14, 2022

Related U.S. Application Data

(63) Continuation of application No. PCT/CN2021/112435, filed on Aug. 13, 2021.

(51) Int. Cl.
*H04W 72/04* (2009.01)
*H04W 24/08* (2009.01)
(Continued)

(52) U.S. Cl.
CPC .......... *H04W 24/08* (2013.01); *H04L 5/0051* (2013.01); *H04W 24/10* (2013.01);
(Continued)

(58) Field of Classification Search
CPC ......... H04W 52/0232; H04W 52/0229; H04W 52/0216; H04W 72/042; H04W 72/0446; H04W 76/28
See application file for complete search history.

(56) References Cited

U.S. PATENT DOCUMENTS

2010/0323719 A1\* 12/2010 Jen .................. H04W 64/00
455/456.1
2019/0289513 A1\* 9/2019 Jeon .................. H04W 72/0453
(Continued)

FOREIGN PATENT DOCUMENTS

EP 3595199 A1 1/2020
WO 2021119127 6/2021

OTHER PUBLICATIONS

International Search Report and Written Opinion—PCT/CN2021/112435—ISA/EPO—dated Jan. 14, 2022.

*Primary Examiner* — Chi Ho A Lee
(74) *Attorney, Agent, or Firm* — Campbell Chiang; MG-IP Law, P.C.

(57) ABSTRACT

Disclosed are techniques for wireless positioning performed by a user equipment. For example, the method includes entering into a Radio Resource Control (RRC) inactive state. The method includes monitoring, during a first time interval, while the user equipment is in the RRC inactive state, one or more first bandwidth parts having a first bandwidth to perform a first operation. The method includes monitoring, during a second time interval, while the user equipment is in the RRC inactive state, one or more second bandwidth parts having a second bandwidth to perform a second operation. The second bandwidth is different than the first bandwidth.

30 Claims, 16 Drawing Sheets

(51) Int. Cl.
  *H04W 24/10* (2009.01)
  *H04W 76/20* (2018.01)
  *H04L 5/00* (2006.01)
  *H04W 68/00* (2009.01)

(52) U.S. Cl.
  CPC ....... *H04W 68/005* (2013.01); *H04W 72/042* (2013.01); *H04W 72/044* (2013.01); *H04W 76/20* (2018.02)

(56) References Cited

U.S. PATENT DOCUMENTS

| | | | |
|---|---|---|---|
| 2019/0319833 A1 | 10/2019 | Nagaraja et al. | |
| 2019/0349881 A1* | 11/2019 | Choi | H04W 64/00 |
| 2020/0229130 A1* | 7/2020 | Keating | H04W 72/048 |
| 2020/0275409 A1* | 8/2020 | Gonzalez | H04W 68/02 |
| 2021/0127450 A1* | 4/2021 | Abdoli | H04W 72/042 |
| 2021/0194734 A1* | 6/2021 | Herath | H04L 5/0051 |
| 2021/0314979 A1* | 10/2021 | Agiwal | H04L 5/0032 |
| 2021/0345293 A1* | 11/2021 | Park | H04L 27/2601 |
| 2021/0410180 A1* | 12/2021 | Tsai | H04L 1/1819 |
| 2022/0038334 A1* | 2/2022 | Siomina | H04L 5/0078 |
| 2022/0046522 A1* | 2/2022 | Kim | H04W 48/16 |
| 2022/0116902 A1* | 4/2022 | Liu | H04W 4/029 |

* cited by examiner

User Plane Protocol Stack

Control Plane Protocol Stack

BANDWIDTH PART (BWP) CONFIGURATION FOR POSITIONING IN AN INACTIVE STATE

CROSS-REFERENCE TO RELATED APPLICATIONS

The present Application for Patent claims priority to International Patent Application No. PCT/CN2021/112435, entitled "Bandwidth Part (BWP) Configuration for Positioning in an Inactive State," filed Aug. 13, 2021, which is assigned to the assignee hereof and expressly incorporated herein by reference in its entirety.

BACKGROUND OF THE DISCLOSURE

1. Field of the Disclosure

Aspects of the disclosure relate generally to wireless communications and more particularly to bandwidth part (BWP) configuration.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

In some cases, a user equipment (UE) may perform a Small Data Transmission (SDT) in an inactive mode, in which the UE is not connected to the network. The size (e.g., bandwidth) limitations associated with the SDT may only allow transmissions of data having up to a particular size.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless positioning performed by a user equipment includes entering into a Radio Resource Control (RRC) inactive state; monitoring, during a first time interval, while the user equipment is in the RRC inactive state, one or more first bandwidth parts having a first bandwidth to perform a first operation; and monitoring, during a second time interval, while the user equipment is in the RRC inactive state, one or more second bandwidth parts having a second bandwidth to perform a second operation, wherein the second bandwidth is different than the first bandwidth.

In an aspect, a user equipment includes a memory; at least one transceiver; and at least one processor communicatively coupled to the memory and the at least one transceiver, the at least one processor configured to: enter into a Radio Resource Control (RRC) inactive state; monitor, during a first time interval, while the user equipment is in the RRC inactive state, one or more first bandwidth parts having a first bandwidth to perform a first operation; and monitor, during a second time interval, while the user equipment is in the RRC inactive state, one or more second bandwidth parts having a second bandwidth to perform a second operation, wherein the second bandwidth is different than the first bandwidth.

In an aspect, a user equipment includes means for entering into a Radio Resource Control (RRC) inactive state; means for monitoring, during a first time interval, while the user equipment is in the RRC inactive state, one or more first bandwidth parts having a first bandwidth to perform a first operation; and means for monitoring, during a second time interval, while the user equipment is in the RRC inactive state, one or more second bandwidth parts having a second bandwidth to perform a second operation, wherein the second bandwidth is different than the first bandwidth.

In an aspect, a non-transitory computer-readable medium storing computer-executable instructions that, when executed by a user equipment, cause the UE to: enter into a Radio Resource Control (RRC) inactive state; monitor, during a first time interval, while the user equipment is in the RRC inactive state, one or more first bandwidth parts having a first bandwidth to perform a first operation; and monitor, during a second time interval, while the user equipment is in the RRC inactive state, one or more second bandwidth parts having a second bandwidth to perform a second operation, wherein the second bandwidth is different than the first bandwidth.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
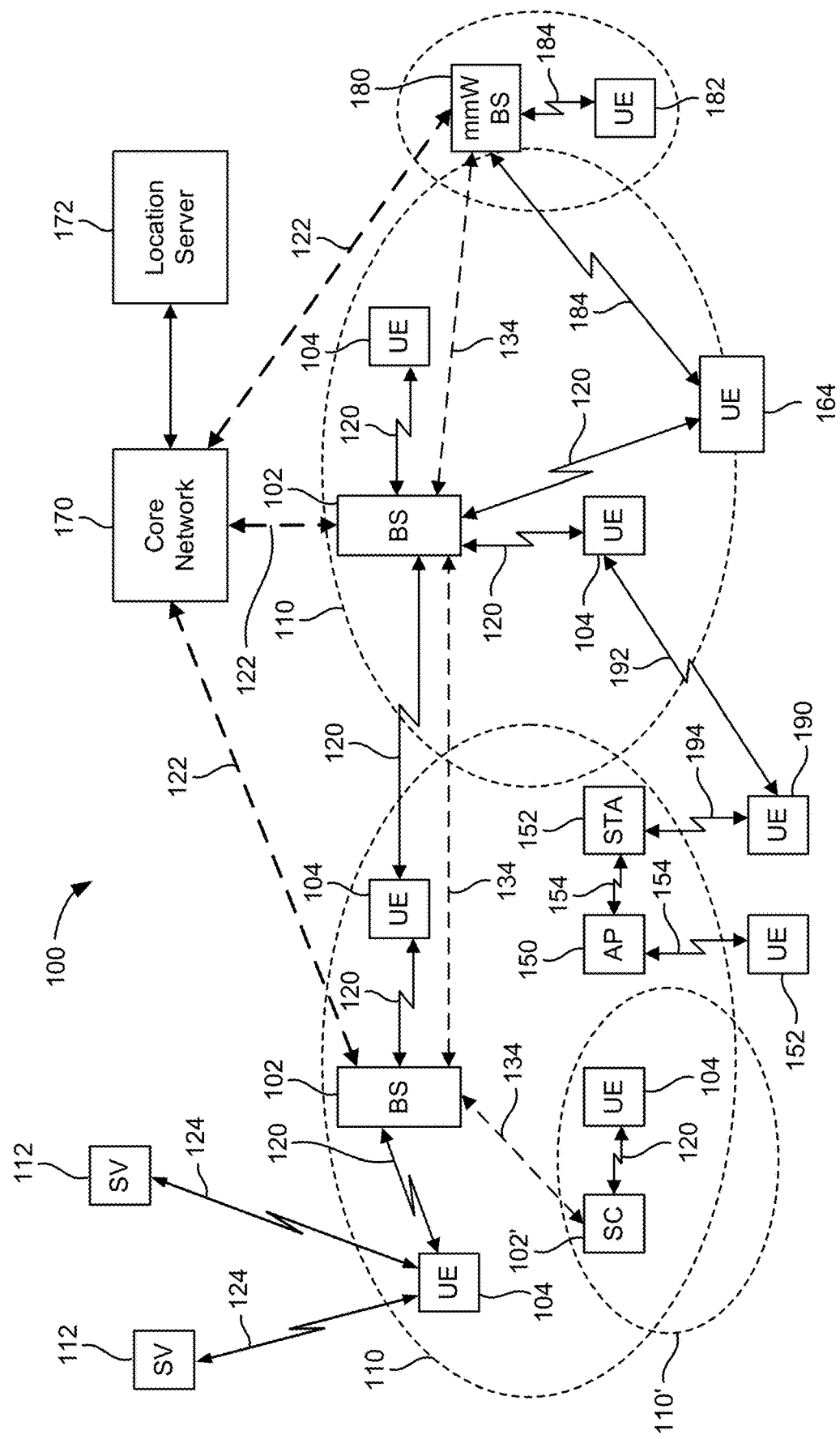
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

A user equipment (UE) may perform a Small Data Transmission (SDT) in an inactive state, in which the UE is not connected to a network. In the inactive state, the UE may be configured to transmit small data packets to a network entity without connecting to the network. A technical advantage of SDT is power savings for the UE because the UE can transmit small data packets while remaining unconnected to the network. In some cases, SDT may be used by UEs that are, for the most part, stationary because mobility across cells may not be supported.

A bandwidth part (BWP) configuration for an SDT may be used for a relatively small bandwidth (BW) as the UE may not use a large BW to transmit small packets. However, a UE configured to perform positioning measurements and/or transmit positioning reference signals may use a larger amount of BW to perform accurate positioning. If a UE is configured for SDT and for positioning, the systems and techniques described herein enable the UE to switch between two separate BWPs, e.g., a first BWP for a small BW task, such as SDT, and a second BWP for a larger BW task, such as positioning. In some cases, the UE may be configured to determine when to switch between the first BWP and the second BWP. In other cases, a network entity, such as a base station, may instruct the UE to switch between the first BWP and the second BWP.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 174, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming.

Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
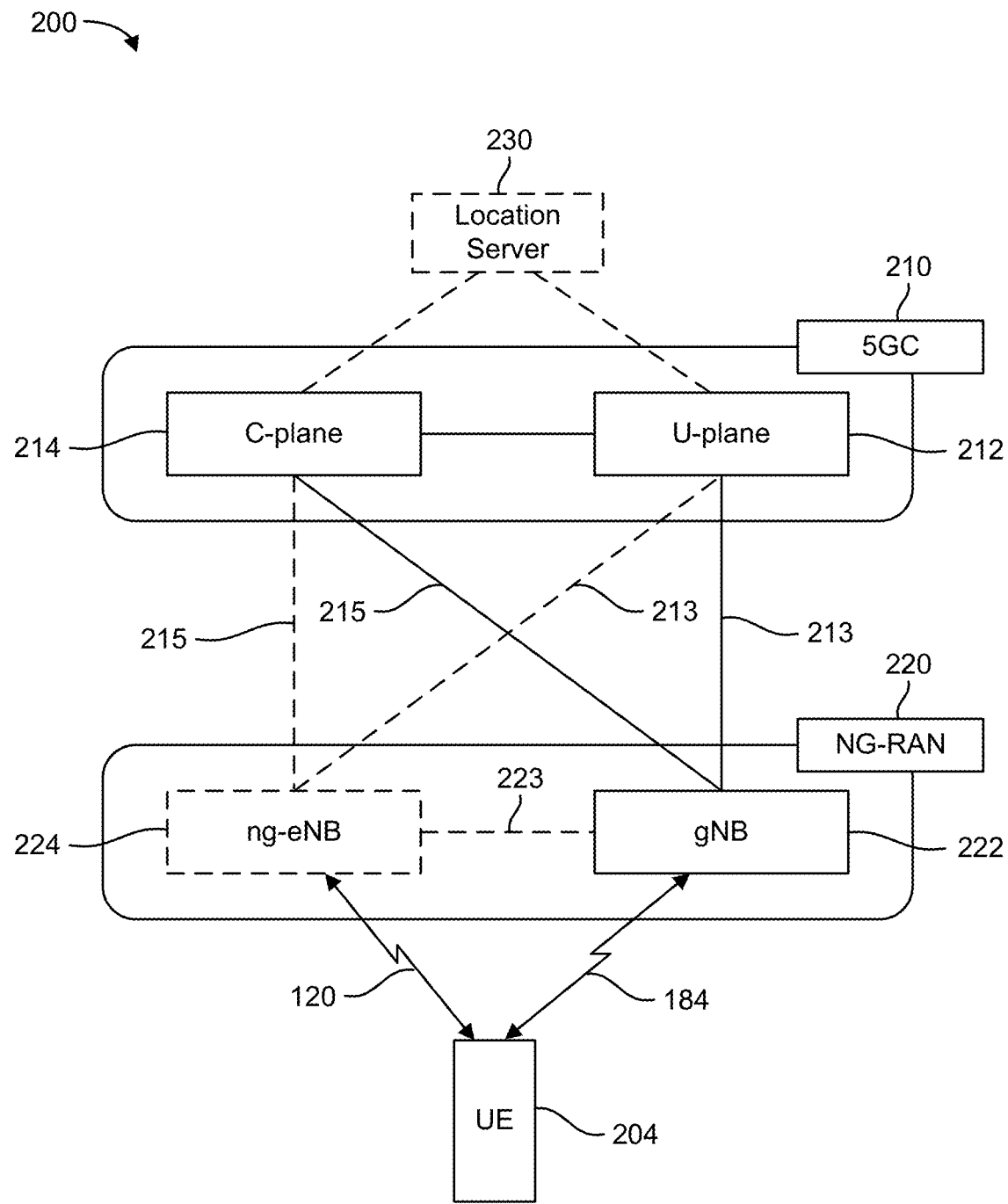
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third-party server, such as an original equipment manufacturer (OEM) server or service server).

Figure 2B:
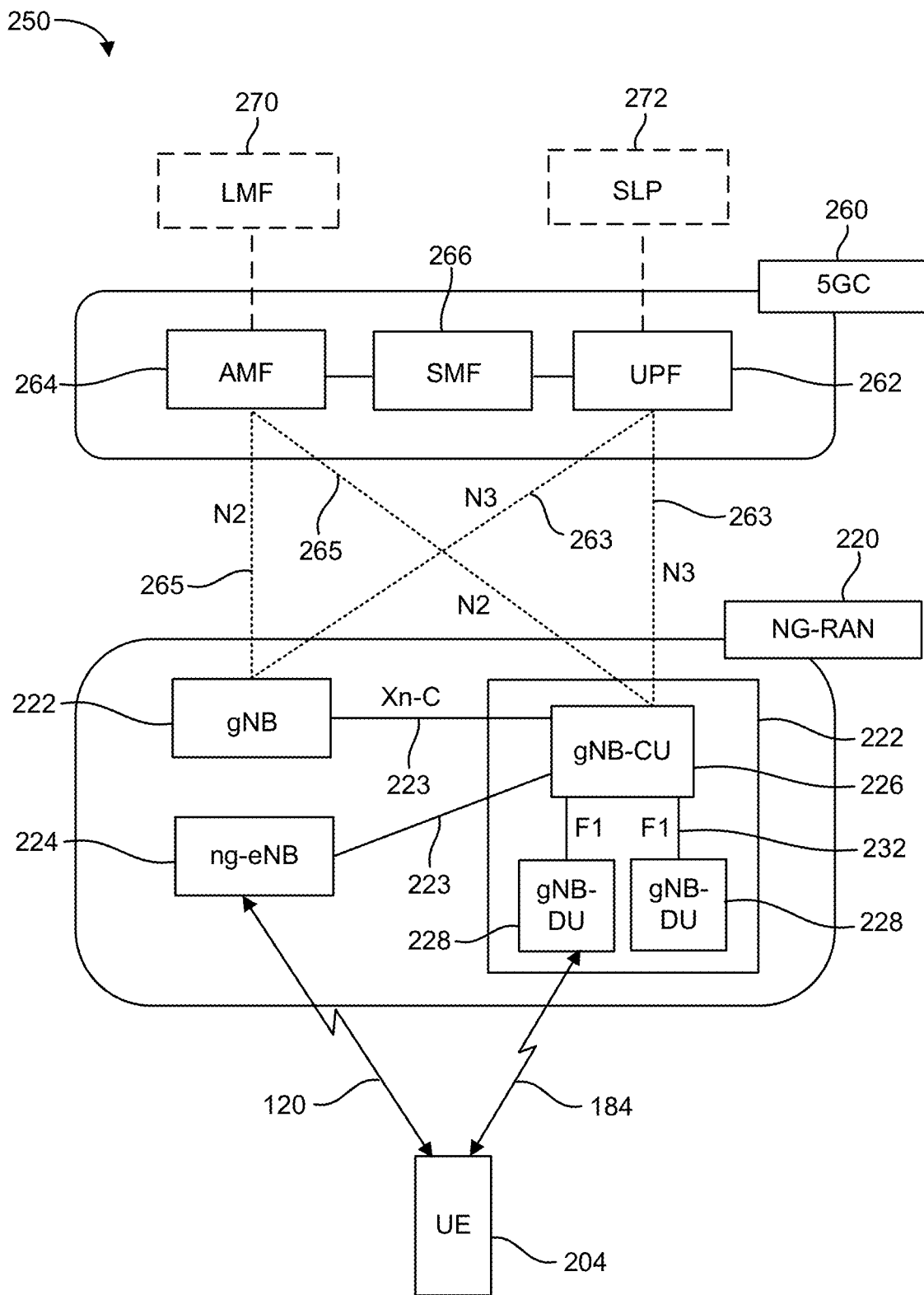

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
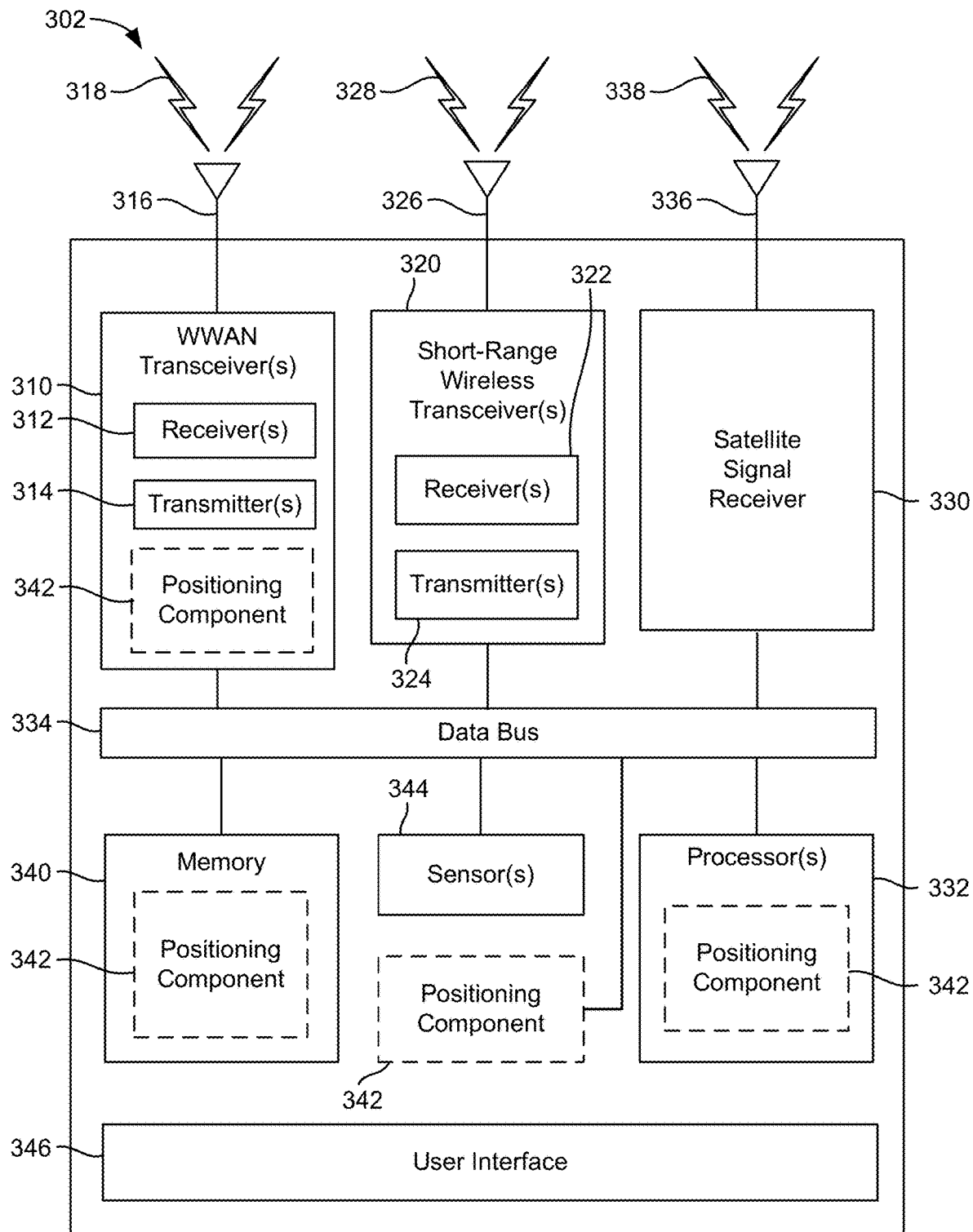
FIGS. 3A, 3B, and 3C are simplified block diagrams of several sample aspects of components that may be employed in a user equipment (UE), a base station, and a network entity, respectively, and configured to support communications as taught herein.
Figure 3B:
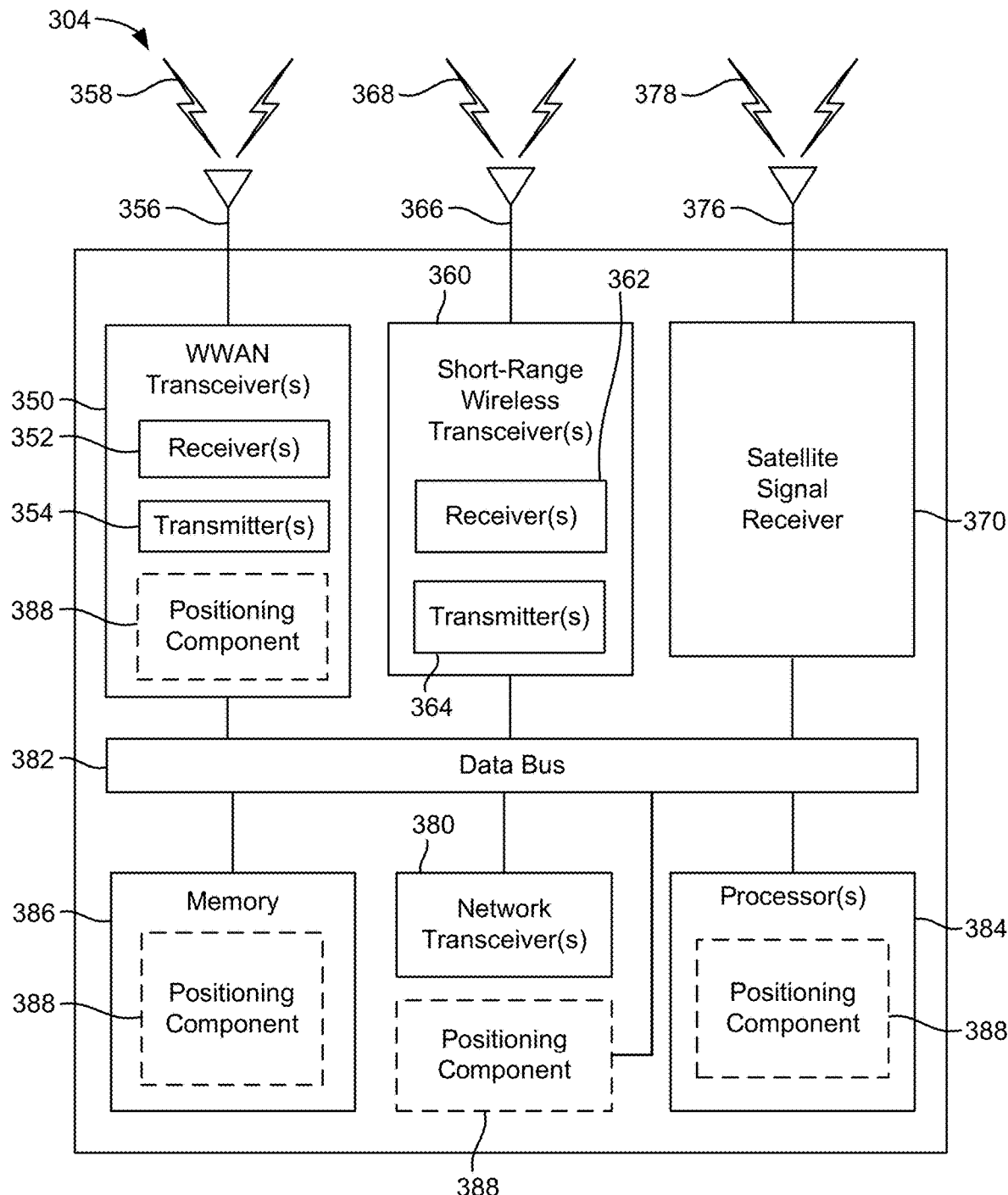
Figure 3C:
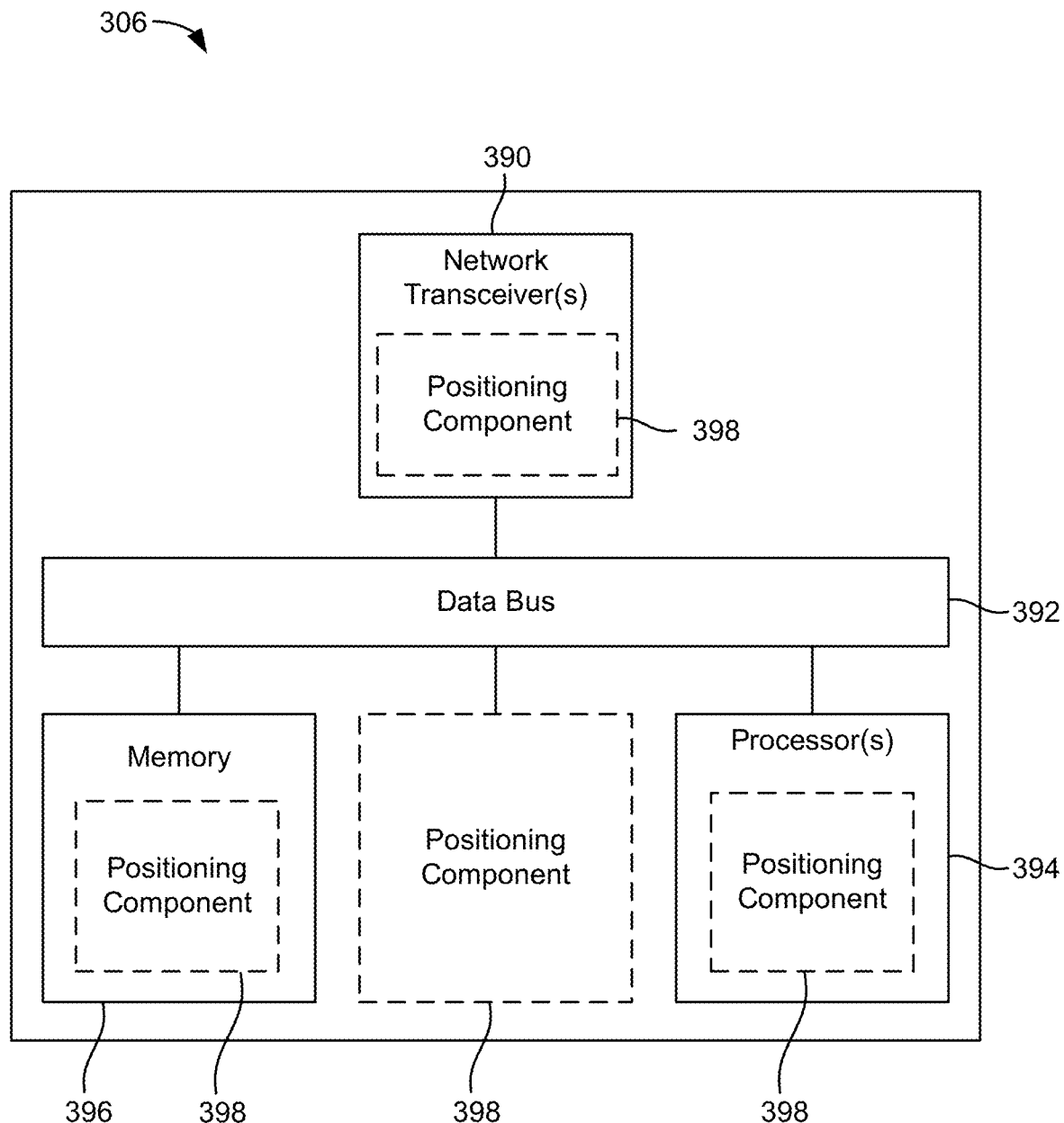

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PCS, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include Positioning Component 342, 388, and 398, respectively. The Positioning Component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the Positioning Component 342, 388, and 398 may be external to the processors 332, 384, and 394 (e.g., part of a modem processing system, integrated with another processing system, etc.). Alternatively, the Positioning Component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the Positioning Component 342, which may be, for example, part of the one or more WWAN transceivers 310, the memory 340, the one or more processors 332, or any combination thereof, or may be a standalone component. FIG. 3B illustrates possible locations of the Positioning Component 388, which may be, for example, part of the one or more WWAN transceivers 350, the memory 386, the one or more processors 384, or any combination thereof, or may be a standalone component. FIG. 3C illustrates possible locations of the Positioning Component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical system (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the Positioning Component 342, 388, and 398, etc.

In some designs, the network entity 306 may be implemented as a core network component. In other designs, the network entity 306 may be distinct from a network operator or operation of the cellular network infrastructure (e.g., NG RAN-220 and/or 5GC 210/260). For example, the network entity 306 may be a component of a private network that may be configured to communicate with the UE 302 via the base station 304 or independently from the base station 304 (e.g., over a non-cellular communication link, such as Wi-Fi).

Figure 4A:
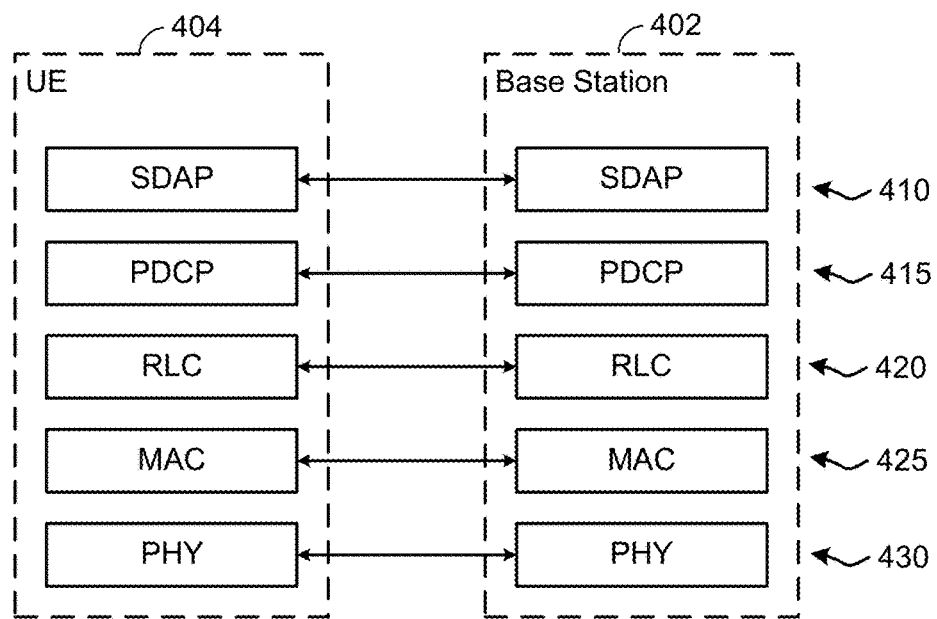
FIGS. 4A and 4B illustrate user plane and control plane protocol stacks, according to aspects of the disclosure.

FIG. 4A illustrates a user plane protocol stack, according to aspects of the disclosure. As illustrated in FIG. 4A, a UE 404 and a base station 402 (which may correspond to any of the UEs and base stations, respectively, described herein) implement, from highest layer to lowest, a service data adaptation protocol (SDAP) layer 410, a packet data convergence protocol (PDCP) layer 415, a radio link control (RLC) layer 420, a medium access control (MAC) layer 425, and a physical (PHY) layer 430. Particular instances of a protocol layer are referred to as protocol "entities." As such, the terms "protocol layer" and "protocol entity" may be used interchangeably.

As illustrated by the double-arrow lines in FIG. 4A, each layer of the protocol stack implemented by the UE 404 communicates with the same layer of the base station 402, and vice versa. The two corresponding protocol layers/entities of the UE 404 and the base station 402 are referred to as "peers," "peer entities," and the like. Collectively, the SDAP layer 410, the PDCP layer 415, the RLC layer 420, and the MAC layer 425 are referred to as "Layer 2" or "L2." The PHY layer 430 is referred to as "Layer 1" or "L1."

Figure 4B:
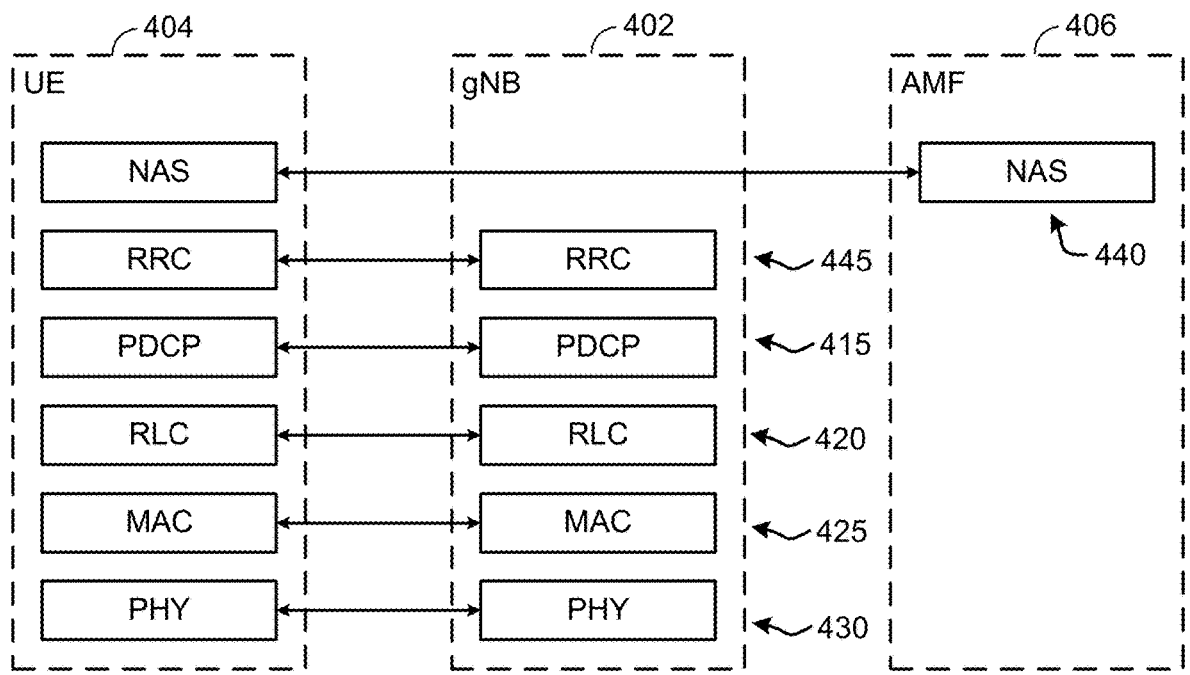

FIG. 4B illustrates a control plane protocol stack, according to aspects of the disclosure. In addition to the PDCP layer 415, the RLC layer 420, the MAC layer 425, and the PHY layer 430, the UE 404 and the base station 402 also implement a radio resource control (RRC) layer 445. Further, the UE 404 and an AMF 406 implement a non-access stratum (NAS) layer 440.

The RLC layer 420 supports three transmission modes for packets: transparent mode (TM), unacknowledged mode (UM), and acknowledged mode (AM). In TM mode, there is no RLC header, no segmentation/reassembly, and no feedback (i.e., no acknowledgment (ACK) or negative acknowledgment (NACK)). In addition, there is buffering at the transmitter only. In UM mode, there is an RLC header, buffering at both the transmitter and the receiver, and segmentation/reassembly, but no feedback (i.e., a data transmission does not require any reception response (e.g., ACK/NACK) from the receiver). In AM mode, there is an RLC header, buffering at both the transmitter and the receiver, segmentation/reassembly, and feedback (i.e., a data transmission requires a reception response (e.g., ACK/NACK) from the receiver). Each of these modes can be used to both transmit and receive data. In TM and UM modes, a separate RLC entity is used for transmission and reception, whereas in AM mode, a single RLC entity performs both transmission and reception. Note that each logical channel uses a specific RLC mode. That is, the RLC configuration is per logical channel with no dependency on numerologies and/or transmission time interval (TTI) duration (i.e., the duration of a transmission on the radio link). Specifically, the broadcast control channel (BCCH), paging control channel (PCCH), and common control channel (CCCH) use TM mode only, the dedicated control channel (DCCH) uses AM mode only, and the dedicated traffic channel (DTCH) uses UM or AM mode. Whether the DTCH uses UM or AM is determined by RRC messaging.

The main services and functions of the RLC layer 420 depend on the transmission mode and include transfer of upper layer protocol data units (PDUs), sequence numbering independent of the one in the PDCP layer 415, error correction through automatic repeat request (ARQ), segmentation and re-segmentation, reassembly of service data units (SDUs), RLC SDU discard, and RLC re-establishment. The ARQ functionality provides error correction in AM mode, and has the following characteristics: ARQ retransmissions of RLC PDUs or RLC PDU segments based on RLC status reports, polling for an RLC status report when needed by RLC, and RLC receiver triggering of an RLC status report after detection of a missing RLC PDU or RLC PDU segment.

The main services and functions of the PDCP layer 415 for the user plane include sequence numbering, header compression and decompression (for robust header compression (ROHC)), transfer of user data, reordering and duplicate detection (if in-order delivery to layers above the PDCP layer 415 is required), PDCP PDU routing (in case of split bearers), retransmission of PDCP SDUs, ciphering and deciphering, PDCP SDU discard, PDCP re-establishment and data recovery for RLC AM, and duplication of PDCP PDUs. The main services and functions of the PDCP layer 415 for the control plane include ciphering, deciphering, and integrity protection, transfer of control plane data, and duplication of PDCP PDUs.

The SDAP layer 410 is an access stratum (AS) layer, the main services and functions of which include mapping between a quality of service (QoS) flow and a data radio bearer and marking QoS flow identifier in both downlink and uplink packets. A single protocol entity of SDAP is configured for each individual PDU session.

The main services and functions of the RRC layer 445 include broadcast of system information related to AS and NAS, paging initiated by the 5GC (e.g., NGC 210 or 260) or RAN (e.g., NG-RAN 220), establishment, maintenance, and release of an RRC connection between the UE and RAN, security functions including key management, establishment, configuration, maintenance, and release of signaling radio bearers (SRBs) and data radio bearers (DRBs), mobility functions (including handover, UE cell selection and reselection and control of cell selection and reselection, context transfer at handover), QoS management functions, UE measurement reporting and control of the reporting, and NAS message transfer to/from the NAS from/to the UE.

The NAS layer 440 is the highest stratum of the control plane between the UE 404 and the AMF 406 at the radio interface. The main functions of the protocols that are part of the NAS layer 440 are the support of mobility of the UE 404 and the support of session management procedures to establish and maintain Internet protocol (IP) connectivity between the UE 404 and the packet data network (PDN). The NAS layer 440 performs evolved packet system (EPS) bearer management, authentication, EPS connection management (ECM)-IDLE mobility handling, paging origination in ECM-IDLE, and security control.

After a random-access procedure, the UE is in an RRC Connected state. The RRC protocol is used on the air interface between a UE and a base station. The major functions of the RRC protocol include connection establishment and release functions, broadcast of system information, radio bearer establishment, reconfiguration, and release, RRC connection mobility procedures, paging notification and release, and outer loop power control. In LTE, a UE may be in one of two RRC states (CONNECTED or IDLE), but in NR, a UE may be in one of three RRC states (CONNECTED, IDLE, or INACTIVE). The different RRC states have different radio resources associated with them that the UE can use when it is in a given state. Note that the different RRC states are often capitalized, as above; however, this is not necessary, and these states can also be written in lowercase.

Figure 5:
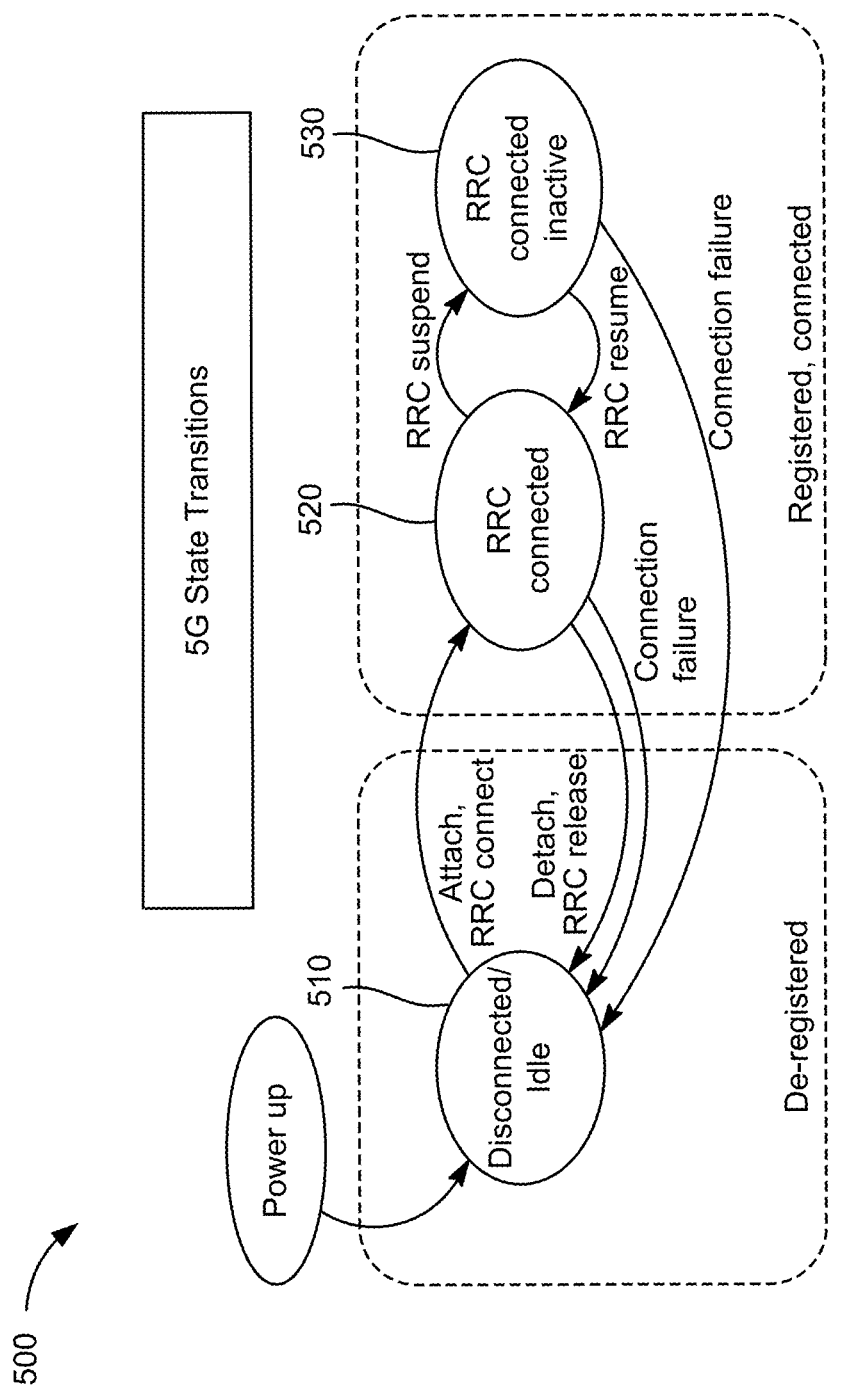
FIG. 5 illustrates the different radio resource control (RRC) states available in New Radio (NR), according to aspects of the disclosure.

FIG. 5 is a diagram 500 of the different RRC states (also referred to as RRC modes) available in NR, according to aspects of the disclosure. When a UE is powered up, it is initially in the RRC DISCONNECTED/IDLE state 510. After a random access procedure, it moves to the RRC CONNECTED state 520. If there is no activity at the UE for a short time, it can suspend its session by moving to the RRC INACTIVE state 530. The UE can resume its session by performing a random access procedure to transition back to the RRC CONNECTED state 520. Thus, the UE needs to perform a random access procedure to transition to the RRC CONNECTED state 520, regardless of whether the UE is in the RRC IDLE state 510 or the RRC INACTIVE state 530.

The operations performed in the RRC IDLE state 510 include public land mobile network (PLMN) selection, broadcast of system information, cell re-selection mobility, paging for mobile terminated data (initiated and managed by the 5GC), discontinuous reception (DRX) for core network paging (configured by non-access stratum (NAS)). The operations performed in the RRC CONNECTED state 520 include 5GC (e.g., 5GC 260) and NG-RAN (e.g., NG-RAN 220) connection establishment (both control and user planes), UE context storage at the NG-RAN and the UE, NG-RAN knowledge of the cell to which the UE belongs, transfer of unicast data to/from the UE, and network controlled mobility.

The RRC INACTIVE state 530 is a state between the RRC CONNECTED state 520 and the RRC IDLE state 510 in which a UE can optionally stay in an inactive state without completely releasing the RRC connection when there is no traffic but quickly switch back to the RRC CONNECTED state 520 when necessary. The operations performed in the RRC INACTIVE state 530 include PLMN selection, the broadcast of system information, cell re-selection for mobility, paging (initiated by the NG-RAN), RAN-based notification area (RNA) management (by the NG-RAN), DRX for RAN paging (configured by the NG-RAN), 5GC and NG-RAN connection establishment for the UE (both control and user planes), storage of the UE context in the NG-RAN and the UE, and NG-RAN knowledge of the RNA to which the UE belongs.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, a UE performs an RTT procedure with multiple base stations to enable its location to be determined (e.g., using multilateration) based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds ($\mu$s). In some cases, when any of the resources used for the positioning measurement are in FR1, the value range for the uncertainty of the expected RSTD may be +/−32 $\mu$s. In other cases, when all of the resources used for the positioning measurement(s) are in FR2, the value range for the uncertainty of the expected RSTD may be +/−8 $\mu$s.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 6:
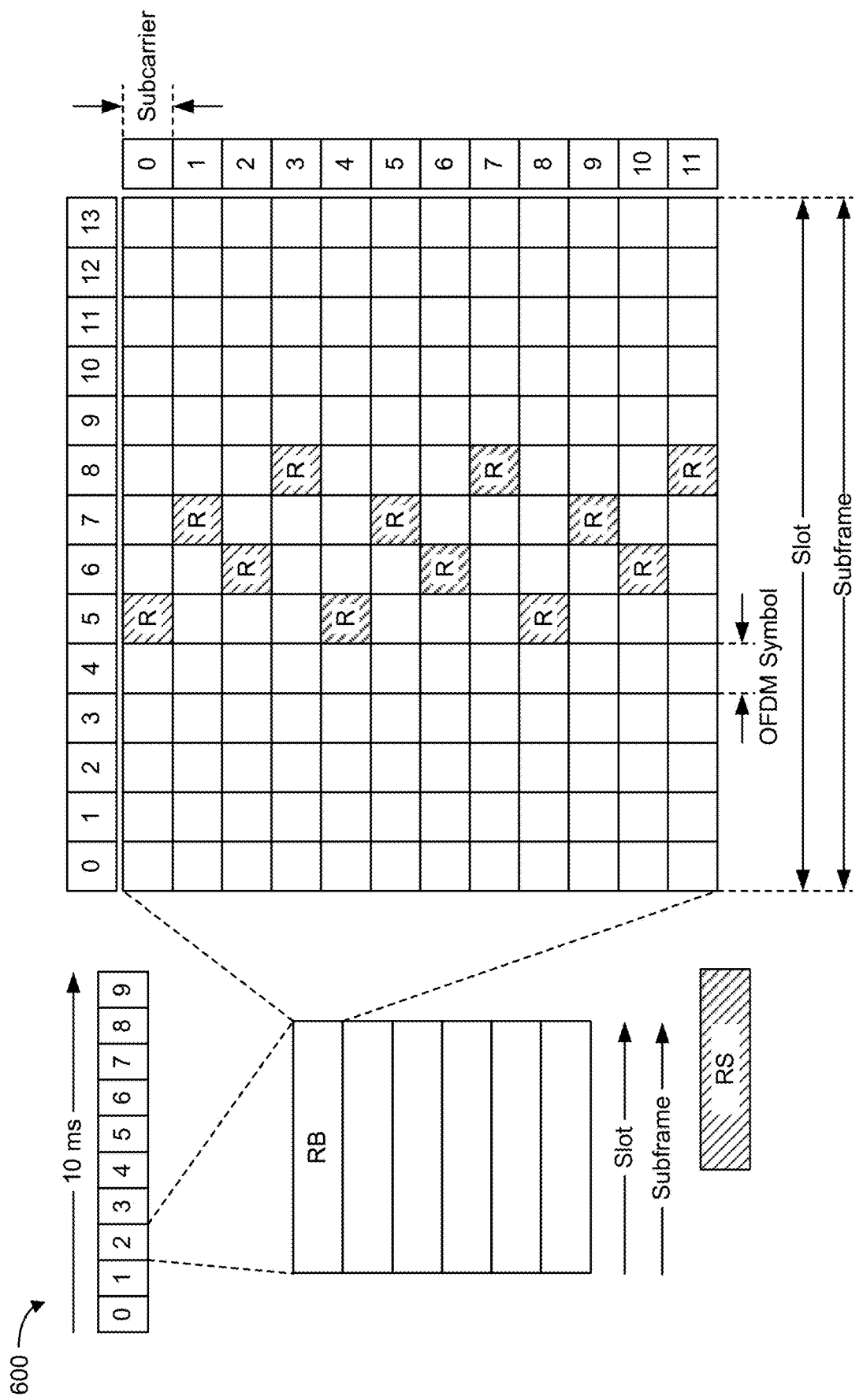
FIG. 6 is a diagram illustrating an example frame structure, according to aspects of the disclosure.

Various frame structures may be used to support downlink and uplink transmissions between network nodes (e.g., base stations and UEs). FIG. 6 is a diagram 600 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 6, a numerology of 15 kHz is used. Thus, in the time domain, a 10 ms frame is divided into 10 equally sized subframes of 1 ms each, and each subframe includes one time slot. In FIG. 6, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 6, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 6 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration.

Figure 7:
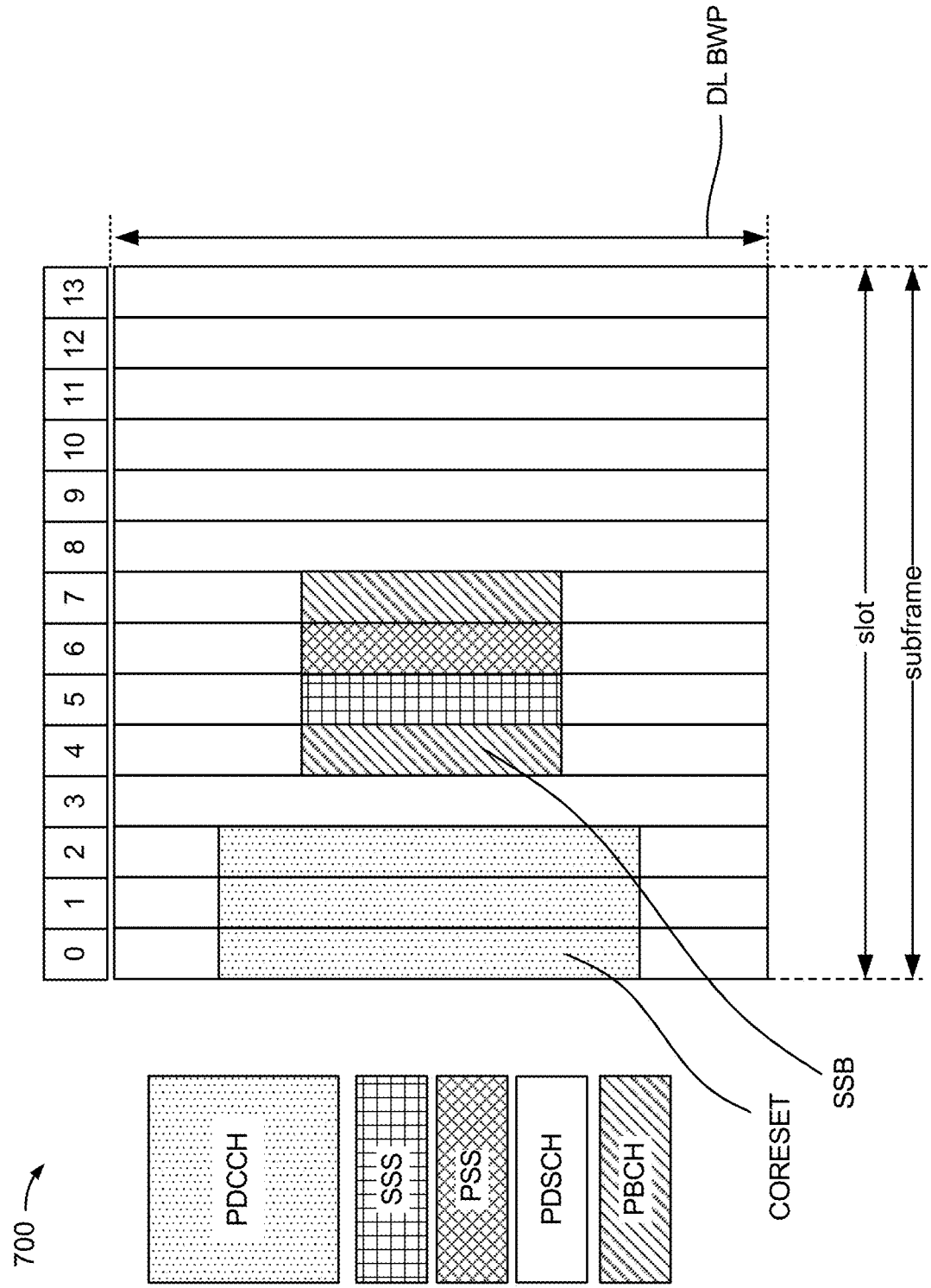
FIG. 7 is a diagram illustrating various downlink channels within an example downlink slot, according to aspects of the disclosure.

Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 7 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 7); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\wedge\mu*$ {4, 5, 8, 10, 16, 20, 32, 40, 64, 80, 160, 320, 640, 1280, 2560, 5120, 10240} slots, with $\mu$=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

FIG. 7 is a diagram 700 illustrating various downlink channels within an example downlink slot. In FIG. 7, time is represented horizontally (on the X axis) with time increasing from left to right, while frequency is represented vertically (on the Y axis) with frequency increasing (or decreasing) from bottom to top. In the example of FIG. 7, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 7, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN).

The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 7, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 7 is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

The following are the currently supported DCI formats. Format 0-0: fallback for scheduling of PUSCH; Format 0-1: non-fallback for scheduling of PUSCH; Format 1-0: fallback for scheduling of PDSCH; Format 1-1: non-fallback for scheduling of PDSCH; Format 2-0: notifying a group of UEs of the slot format; Format 2-1: notifying a group of UEs of the PRB(s) and OFDM symbol(s) where the UEs may assume no transmissions are intended for the UEs; Format 2-2: transmission of TPC commands for PUCCH and PUSCH; and Format 2-3: transmission of a group of SRS requests and TPC commands for SRS transmissions. Note that a fallback format is a default scheduling option that has non-configurable fields and supports basic NR operations. In contrast, a non-fallback format is flexible to accommodate NR features.

As will be appreciated, a UE needs to be able to demodulate (also referred to as "decode") the PDCCH in order to read the DCI, and thereby to obtain the scheduling of resources allocated to the UE on the PDSCH and PUSCH. If the UE fails to demodulate the PDCCH, then the UE will not know the locations of the PDSCH resources and it will keep attempting to demodulate the PDCCH using a different set of PDCCH candidates in subsequent PDCCH monitoring occasions. If the UE fails to demodulate the PDCCH after some number of attempts, the UE declares a radio link failure (RLF). To overcome PDCCH demodulation issues, search spaces are configured for efficient PDCCH detection and demodulation.

Generally, a UE does not attempt to demodulate each and very PDCCH candidate that may be scheduled in a slot. To reduce restrictions on the PDCCH scheduler, and at the same time to reduce the number of blind demodulation attempts by the UE, search spaces are configured. Search spaces are indicated by a set of contiguous CCEs that the UE is supposed to monitor for scheduling assignments/grants relating to a certain component carrier. There are two types of search spaces used for the PDCCH to control each component carrier, a common search space (CSS) and a UE-specific search space (USS).

A common search space is shared across all UEs, and a UE-specific search space is used per UE (i.e., a UE-specific search space is specific to a specific UE). For a common search space, a DCI cyclic redundancy check (CRC) is scrambled with a system information radio network temporary identifier (SI-RNTI), random access RNTI (RA-RNTI), temporary cell RNTI (TC-RNTI), paging RNTI (P-RNTI), interruption RNTI (INT-RNTI), slot format indication RNTI (SFI-RNTI), TPC-PUCCH-RNTI, TPC-PUSCH-RNTI, TPC-SRS-RNTI, cell RNTI (C-RNTI), or configured scheduling RNTI (CS-RNTI) for all common procedures. For a UE-specific search space, a DCI CRC is scrambled with a C-RNTI or CS-RNTI, as these are specifically targeted to individual UE.

A UE demodulates the PDCCH using the four UE-specific search space aggregation levels (1, 2, 4, and 8) and the two common search space aggregation levels (4 and 8). Specifically, for the UE-specific search spaces, aggregation level '1' has six PDCCH candidates per slot and a size of six CCEs. Aggregation level '2' has six PDCCH candidates per slot and a size of 12 CCEs. Aggregation level '4' has two PDCCH candidates per slot and a size of eight CCEs. Aggregation level '8' has two PDCCH candidates per slot and a size of 16 CCEs. For the common search spaces, aggregation level '4' has four PDCCH candidates per slot and a size of 16 CCEs. Aggregation level '8' has two PDCCH candidates per slot and a size of 16 CCEs.

Each search space comprises a group of consecutive CCEs that could be allocated to a PDCCH, referred to as a PDCCH candidate. A UE demodulates all of the PDCCH candidates in these two search spaces (USS and CSS) to discover the DCI for that UE. For example, the UE may demodulate the DCI to obtain the scheduled uplink grant information on the PUSCH and the downlink resources on the PDSCH. Note that the aggregation level is the number of REs of a CORESET that carry a PDCCH DCI message, and is expressed in terms of CCEs. There is a one-to-one mapping between the aggregation level and the number of CCEs per aggregation level. That is, for aggregation level '4,' there are four CCEs. Thus, as shown above, if the aggregation level is '4' and the number of PDCCH candidates in a slot is '2,' then the size of the search space is '8' (i.e., 4×2=8).

A bandwidth part (BWP) enables more flexibility in how resources are assigned in a given carrier. BWPs provide flexibility to enable multiple, different signal types to be sent in a particular bandwidth. BWPs enables multiplexing of different signals and signal types for better utilization and adaptation of spectrum and UE power. For example, a maximum carrier bandwidth for 5G NR is up to 100 megahertz (MHz) in frequency range 1 (FR1: 450 MHz to 6 gigahertz (GHz)), or up to 400 MHz in frequency range 2 (FR2: 24.25 GHz to 52.6 GHz) that can be aggregated with a maximum bandwidth of 800 MHz. With BWPs, the carriers can be subdivided and used for different purposes. Each 5G NR numerology has its own BWP, meaning that each BWP can be configured differently with its own signal characteristics, enabling more efficient use of the spectrum and more efficient use of power, thereby enabling integration of different types of signals. For example, one BWP may have reduced energy requirements, while another BWP may support different functions or services, and so on. BWPs can also be used to support legacy 4G devices along with new 5G devices on the same carrier.

Figure 8A:
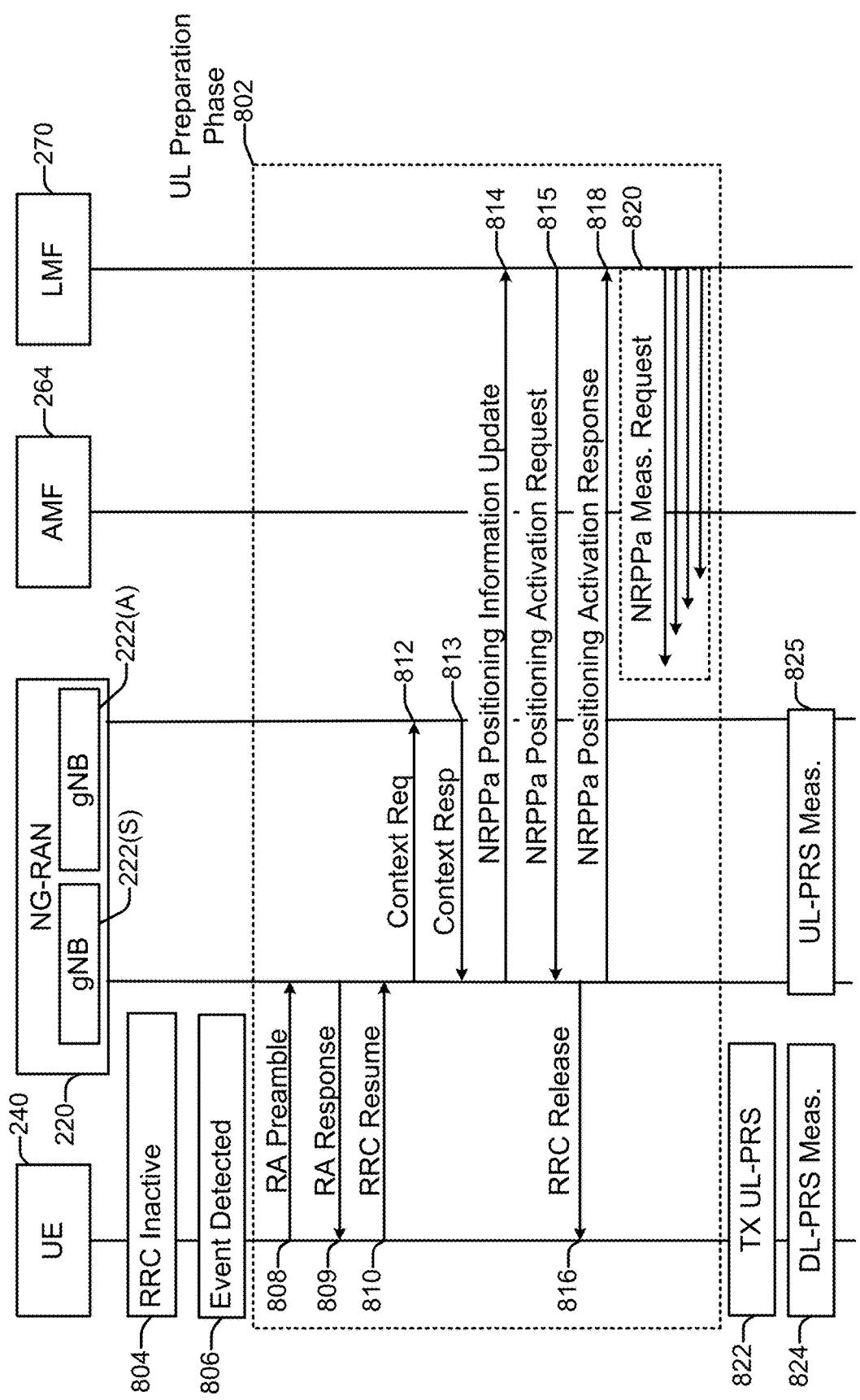
FIGS. 8A and 8B illustrate an example of phases associated with a small data transmission (SDT), according to aspects of the disclosure.
Figure 8B:
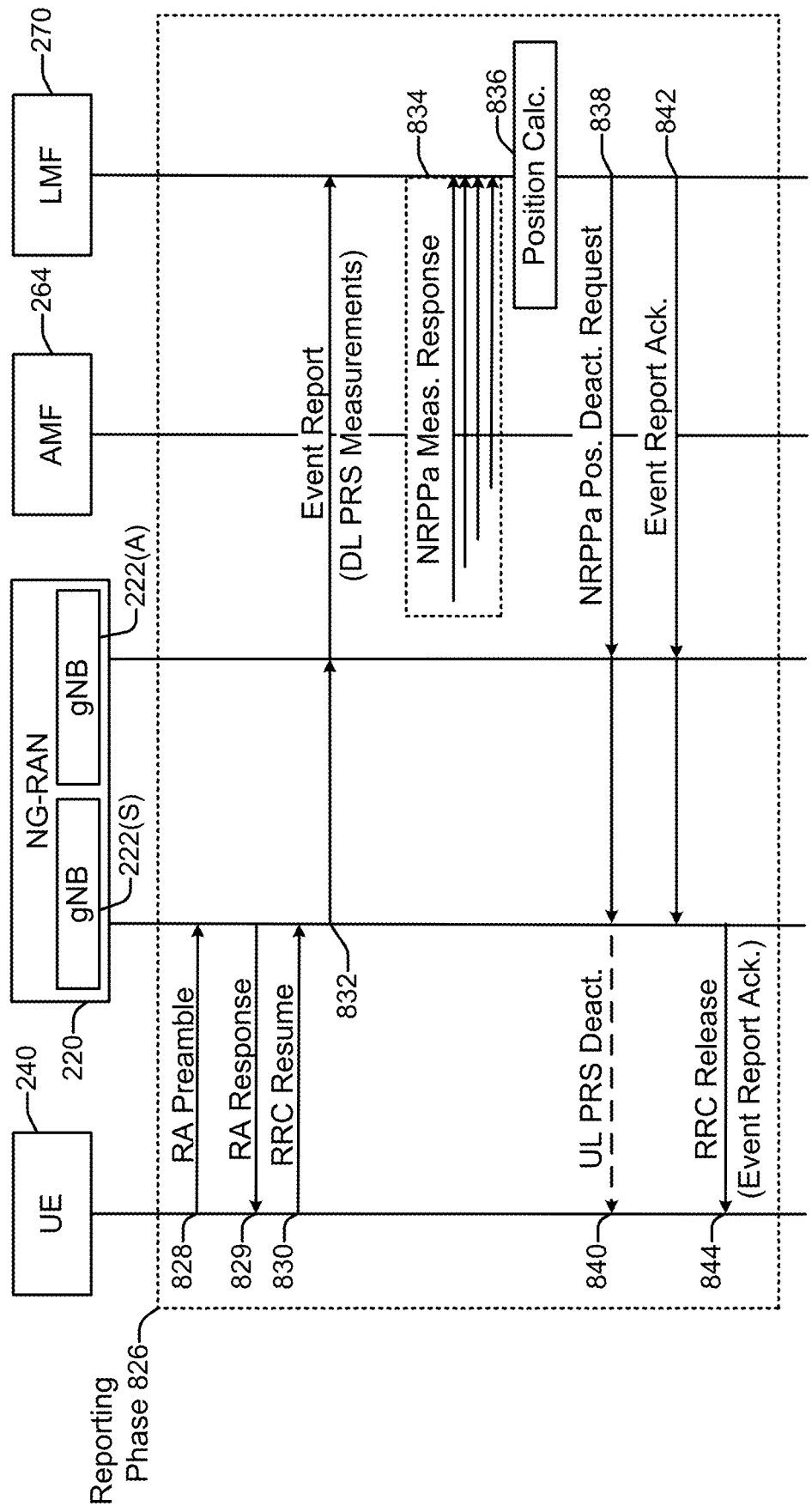

FIGS. 8A and 8B illustrate an example of phases associated with a small data transmission (SDT), according to aspects of the disclosure. FIG. 8A illustrates an Uplink (UL) preparation phase 802 associated with the SDT. In the example of FIG. 8A, the NG-RAN 220 includes a serving gNB, gNB 222(S), and an anchor gNB, gNB 222(A).

At 804, the UE 204 is in a Radio Resource Control (RRC) inactive state. At 806, the UE detects an event and, in response, at 808, sends a random access (RA) preamble to the gNB 222(S). At 809, the UE 204 receives an RA response from the gNB 222(S), causing the UE 204 to, at 810, connect to the gNB 222(S) and send an RRC resume request. The RRC resume request may include a location event indication.

At 812, the gNB 222(S) sends a UE context request (e.g., a UL PRS configuration) to the gNB 222(A) and, at 813, the gNB 222(S) receives a context response (e.g., an UL PRS configuration) from the gNB 222(A).

At 814, the gNB 222(S) sends a new radio (NR) Positioning Protocol A (NRPPa) positioning information update request (e.g., including UL PRS configuration information) to the LMF 270. At 815, the LMF 270 sends an NRPPa positioning activation request to the gNB 222(S).

At 816, the gNB 222(S) sends an RRC release message to the UE 204. The RRC release message may, for example, include a UL PRS configuration, media access control (MAC) control element (MAC-CE) sounding reference signal (SRS) activation, cell group (CG) configuration information, or any combination thereof. At 820, the LMF 270 sends NRPPa measurement requests to each involved gNB 222 in the NG-RAN 220.

After the UL preparation phase 802 is completed, at 822, the UE 204 transmits (Tx) an UL-PRS, at 824, the UE 204 performs DL-PRS measurements, and at 825, the gNB 222(S) and gNB 222(A) perform UL-PRS measurements of the UL-PRS transmitted at 822.

FIG. 8B illustrates an event and measurement reporting phase 826 associated with a small data transmission (SDT). At 828, the UE 204 transmits an RA preamble to the gNB 222(S) and in response, receives, at 829, an RA response. At 830, the UE 204 sends an RRC resume request to the gNB 222(S). In some cases, the RRC resume request includes an event report and DL PRS measurements.

At 832, the gNB 222(S) forwards the event report (e.g., DL PRS measurements) to the LMF 270. At 834, the LMF 270 receives one or more NRPPa measurement responses from the involved gNBs 222. At 836, the LMF 270 performs position-related calculations to estimate the location of the UE 204. At 838, the LMF 270 sends an NRPPa positioning deactivation request to the gNB 222(S) and gNB 222(A). At 840, the gNB 222(S) may send a UL PRS deactivation message to the UE 204.

At 842, the LMF 270 sends an event report acknowledgment to the gNB 222(S) and gNB 222(A). At 844, the gNB 222(S) sends an RRC release (e.g., an event report acknowledgement) to the UE 204.

Thus, cell group small data transmission (CG-SDT) resource configuration is provided to UEs, such as the UE 204, when in a connected state (e.g., RRC Connected) in the RRC release message. For example, the CG-SDT resource configuration may not be included in an RRC Reconfiguration message. CG physical uplink shared channel (CG-PUSCH) resources can be separately configured for Normal Uplink (NUL) and Supplementary Uplink (SUL) and, in some cases, at the same time. The RRC release message is used to reconfigure or release the CG-SDT resources when the UE 204 is in the inactive state (e.g., RRC Inactive). For CG-SDT, a subsequent data transmission can use the CG resource or a dynamic grant (DG) that is addressed to the UE's cell radio network temporary identifier (C-RNTI). The C-RNTI can be the same as a previous C-RNTI or may be configured by the network. A time alignment timer (TAT) for the SDT is started upon receiving the TAT-SDT configuration from gNB, e.g., in an RRC release message, and can be (re)started upon reception of a timing advance (TA) command. From the point of view of the radio access network (RAN), similar to a preconfigured uplink resource (PUR), a TA validation mechanism for SDT may be based on a change in RSRP, e.g., RSRP-based thresholds may be configured that the RAN may be asked to confirm. In some cases, the network may be configured to support multiple CG-SDT configurations per carrier in RRC. In some aspects, the CG-SDT resources may be valid in one cell (e.g., a cell in which an RRC release message is received) and the UE 204 may release CG-SDT resources when the TAT expires in the RRC inactive state. For a random access (RA) SDT, up to two preamble groups (e.g., corresponding to two different payload sizes for MsgA/Msg3) may be configured by the network. MsgA refers to when a physical random-access channel (PRACH) and a physical uplink shared channel (PUSCH) are transmitted together. Msg3 is a scheduled uplink transmission. If a random-access channel (RACH) procedure is initiated for an SDT (e.g., RA-SDT initiated), then the UE 204 first performs a RACH type selection as specified in the medium access control (MAC).

Figure 9:
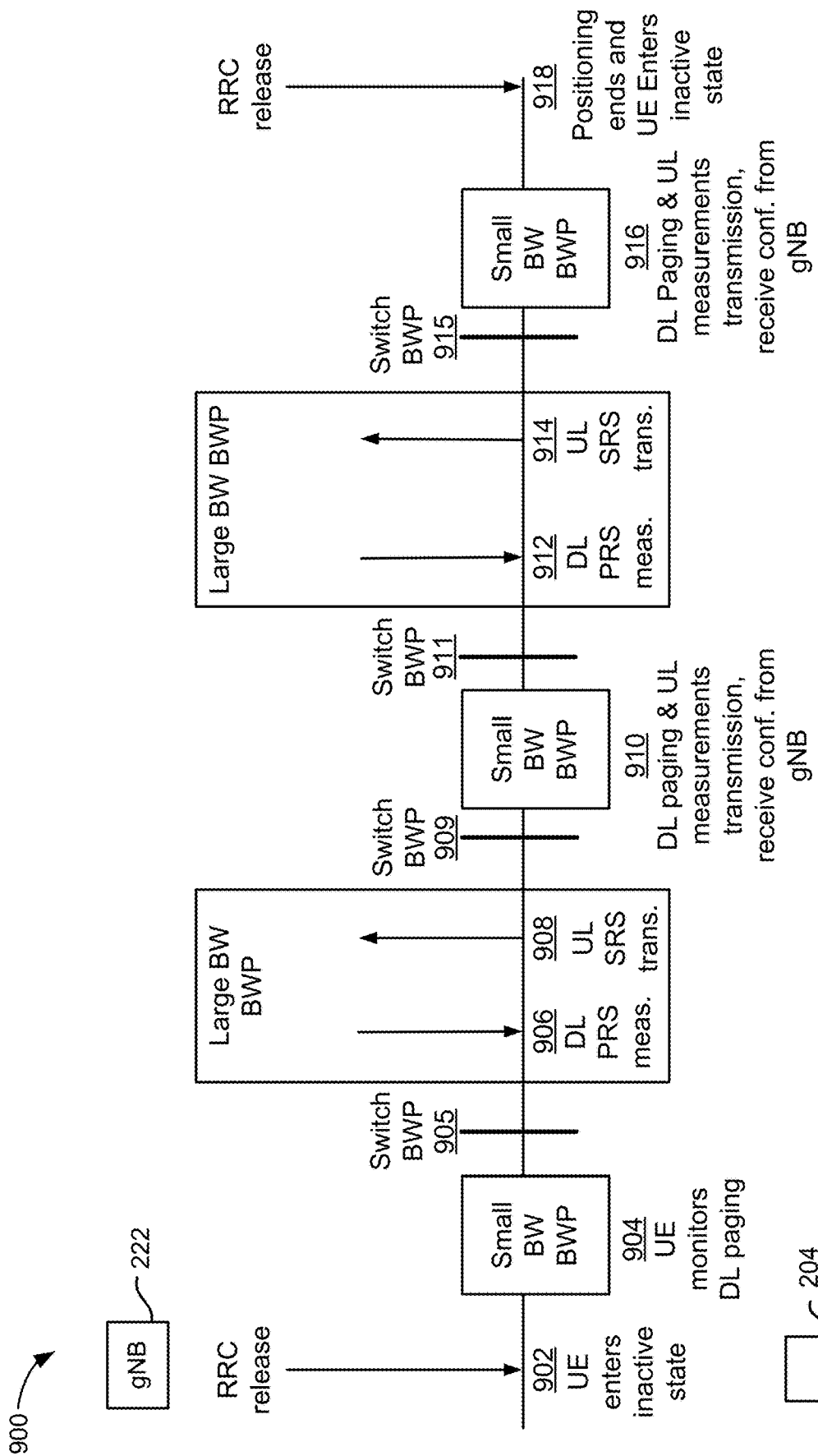
FIG. 9 illustrates an example in which a user equipment (UE) switches to a bandwidth part (BWP) for an event and automatically switches back to a default BWP after completing the event, according to aspects of the disclosure, according to aspects of the disclosure.

FIG. 9 illustrates an example 900 in which a user equipment (UE) switches to a bandwidth part (BWP) for an event and automatically switches back to a default BWP after completing the event, according to aspects of the disclosure. In FIG. 9, the UE 204 is configured with information regarding when particular operations (e.g., PRS measurement events) occur while the UE 204 is in an RRC inactive state. The UE 204 selects an appropriate BWP prior to each event and then switches back to a default BWP after completing the event. For example, the UE 204 may be configured to monitor one or more BWPs having a first (e.g., default) bandwidth to perform a first operation. At a configured time, the UE 204 may automatically switch to monitor one or more second BWPs and perform a second operation, such as performing and transmitting PRS measurements. After completing the operation, the UE 204 may automatically switch to monitoring the one or more low bandwidth (e.g., default) BWPs. For example, a PDCCH and a PDSCH may use the low bandwidth (e.g., default) BWP. In FIG. 9, performing and transmitting a PRS measurement is used as an example of a large bandwidth operation. It should be understood that the UE 204 may perform other large BW operations instead of (or in addition to) PRS measurements as the second operation.

At 902, the UE 204 receives an RRC release message from a network entity (e.g., the gNB 222). In response, the UE 204 enters into an RRC inactive state. At 904, the UE 204 monitors, in the RRC inactive state, a DL paging of one or more BWPs having a first bandwidth. For example, the first bandwidth may be a low bandwidth. In some aspects, the first bandwidth may be a default bandwidth.

At 905, the UE 204 switches to monitoring one or more second BWPs having a second bandwidth to perform a second operation. The second bandwidth is different than the first bandwidth. For example, the second bandwidth may be larger than the first bandwidth. To illustrate, the UE 204 may, perform large BW BWP operations, such as DL PRS measurements, at 906 and, a UL SRS transmission (e.g., to a network entity, such as the gNB 222), at 908. At 909, after completing the large bandwidth operations, the UE 204 switches to monitoring the one or more BWPs having the first bandwidth and perform operations that use the first bandwidth. For example, the UE 204 uses the default small bandwidth to, at 910, monitor the DL paging, monitor the UL measurements transmission, and receive a confirmation (e.g., associated with the UL SRS transmission) from a network entity, such as the gNB 222.

The UE 204 switches to monitoring the one or more second BWPs and perform one or more operations that use the second bandwidth (e.g., a large amount of bandwidth). For example, the UE 204 may, at 912, perform DL PRS measurements and, at 914, perform a UL SRS transmission (e.g., to a network entity, such as the gNB 222). After completing the one or more second operations, at 915, the UE 204 switches to monitoring the one or more first BWPs having the first bandwidth. For example, the UE 204 monitors the first BWPs (e.g., that use a small bandwidth) to, at 916, monitor the DL paging, monitor the UL measurements transmission, and receive a confirmation (e.g., associated with the UL SRS transmission) from a network entity, such as the gNB 222.

The UE 204 receives an RRC release message (e.g., from a network entity, such as the gNB 222) indicating that the one or more second operations (e.g., that use a large amount of bandwidth, such as positioning) have been completed. In response to receiving the RRC release message, at 918, the UE 204 stops performing positioning and enters into an RRC inactive state.

Thus, in some aspects, a UE is configured with information associated with when to switch from monitoring a first (e.g., default) BWP to monitoring a second BWP. For example, the UE may use first BWPs to perform a first operation (or a first set of operations) that use a small bandwidth and monitor second BWPs to perform a second operation (or a second set of operations) that use a large bandwidth (e.g., performing and transmitting PRS measurements). Prior to performing the second operation (or the second set of operations) that use the large bandwidth, the UE may automatically switch from monitoring the one or more first BWPs to monitoring the one or more second BWPs and perform the second operation(s). After performing the second operation(s), the UE may switch back to monitoring the one or more first (e.g., default) BWPs. In this way, the UE may switch between two BWPs. While switching between two BWPs is used for illustration purposes, the systems and techniques described herein may be used to enable the UE to switch between multiple (e.g., more than two) BWPs, with each BWP having a bandwidth that is different from the remaining BWPs.

Figure 10:
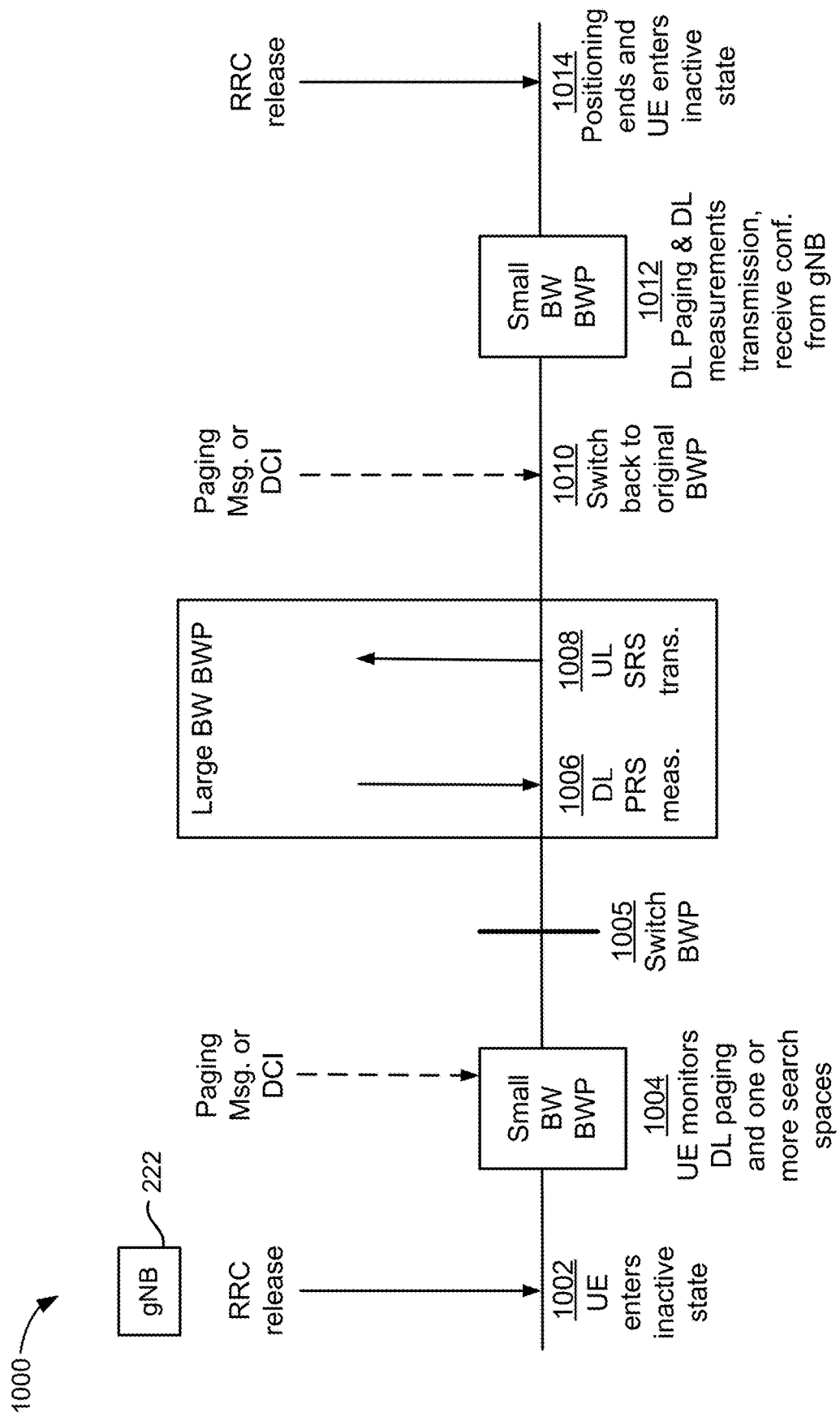
FIG. 10 illustrates an example in which a UE receives an instruction from a network entity to switch to a particular BWP, according to aspects of the disclosure.

FIG. 10 illustrates an example 1000 of a UE receiving an instruction from a network entity to switch to a particular BWP, according to aspects of the disclosure. The UE 204 receives a dedicated downlink control information (DCI) message for switching the BWP without scheduling user data for the UE 204. Instead of the DCI indicating (e.g., scheduling) when and where the gNB will transmit DL data to the UE 204, in this example, the DCI triggers the UE 204 to switch the BWP. In this way, a paging DCI is used to cause the UE 204 to switch from monitoring first BWPs to monitoring second BWPs. For example, a field may be added to the DCI message to indicate BWP configurations. To illustrate, a bit field may be added, with "0" indicating a first BWP and "1" indicating a second BWP. The field may be added to the paging DCI message in such a way that the paging DCI message retains compatibility with older UE paging formats. In other cases, a new DCI capable of indicating BWP configurations may be defined and used. For example, a search space and Control Resource set (CORESET) may be configured either before or with the RRC release message. In some aspects, the paging search space may be reused for the new DCI. For example, the UE 204 may search for a DCI with an inactive Radio Network Temporary Identifier (I-RNTI) within the (reused) paging search space. By configuring more than one BWP, the gNB can control the BWP used by the UE 204 for large bandwidth operations, such as positioning. For example, the UE 204 can be configured to send a large BW positioning measurement to the gNB 222 at a first interval (e.g., every hour) and smaller BW positioning measurements at a second interval (e.g., every fifteen minutes) after sending the large BW measurements. In some aspects, the systems and techniques described herein may be used when the UE is locally mobile (e.g., stays within the same cell). If the UE moves a larger distance (e.g., moves from one cell to another cell), the UE may move to an RRC connected state for large bandwidth operations, such as measurement reporting.

The UE 204 receives an RRC release message from a network entity (e.g., the gNB 222) and, at 1002, enters into an RRC inactive state. At 1004, the UE monitors one or more first BWPs, DL paging, and one or more search spaces and receives either a paging message or a DCI message that causes the UE 204 to switch to monitoring one or more second BWPs, at 1005. The UE 204 performs an operation that uses a large bandwidth, such as, at 1006, performing DL PRS measurements and, at 1008, performing an UL SRS transmission (e.g., to the gNB 222). At 1010, the UE 204 receives either a paging message or a DCI message that causes the UE 204 to switch back to monitoring an original (e.g., first) BWPs. The UE 204 uses the small bandwidth of the one or more first BWPs to, at 1012, receive DL paging and/or perform DL measurements transmission and receive a confirmation from a network entity, such as the gNB 222. The UE 204 receives an RRC release message that causes the UE 204, at 1014, to stop performing the large bandwidth operation (e.g., positioning) and enter into an RRC inactive state.

Thus, a UE may be instructed by a network entity, such as a gNB, to switch between two (or more) BWPs, such as between one or more first BWPs and one or more second BWPs. In some cases, the one or more first BWPs may have a default (e.g., small) bandwidth. For example, the UE may monitor the one or more first BWP to perform a first operation (or a first set of operations) that uses a small amount of bandwidth. The network entity may send a message instructing the UE to switch to monitoring one or more second BWPs and perform a second operation (or a second set of operations) that use a different amount of bandwidth than the first operation. After the UE performs the second operation, the network entity may send an instruction to the UE to switch back to the one or more first BWPs. In this way, the network entity (e.g., gNB) may send instructions to the UE to switch from one or more first BWPs to one or more second BWPs and back again. While switching between two BWPs is used for illustration purposes, the systems and techniques described herein may be used to enable the network entity to cause the UE to switch between multiple (e.g., more than two) BWPs.

Figure 11:
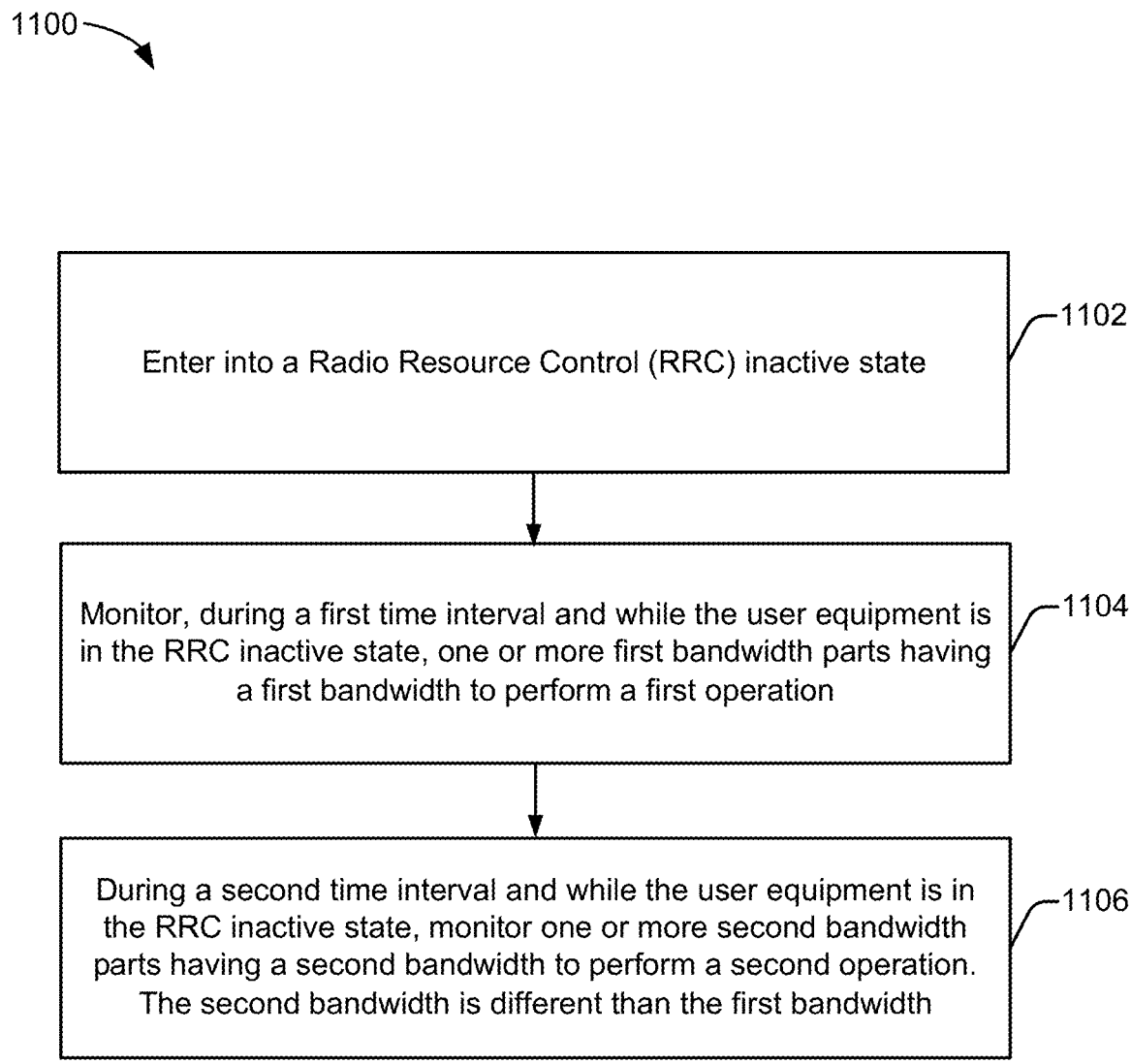
FIG. 11 illustrates an example method of wireless positioning performed by a user equipment (UE), according to aspects of the disclosure.

FIG. 11 illustrates an example method 1100 of wireless positioning, according to aspects of the disclosure. The method 1100 may be performed by a user equipment, such as the UE 204.

At 1102, the UE 204 enters into a radio resource control (RRC) inactive state. For example, as at 902 in FIG. 9, the UE 204 enters into the RRC inactive state in response to receiving the RRC release message from a network entity, such as the gNB 222. In an aspect, 1102 may be performed by the one or more WWAN transceivers 310, the one or more processors 332, the memory 340, and/or the Positioning Component 342, any or all of which may be considered means for performing this operation.

At 1104, the UE 204 monitors, during a first time interval and while the UE 204 is in the RRC in active state, one or more first bandwidth parts having a first bandwidth to perform a first operation. In an aspect, 1102 may be performed by the one or more WWAN transceivers 310, the one or more processors 332, the memory 340, and/or the Positioning Component 342, any or all of which may be considered means for performing this operation.

At 1106, the UE 204, during a second time interval and while the UE 204 is in the RRC inactive state, monitors one or more second bandwidth parts having a second bandwidth to perform a second operation. The second bandwidth is different than the first bandwidth. In an aspect, 1102 may be performed by the one or more WWAN transceivers 310, the one or more processors 332, the memory 340, and/or the Positioning Component 342, any or all of which may be considered means for performing this operation.

As will be appreciated, a technical advantage of method 1100 is that the UE can remain in an RRC inactive state to monitor different BWPs, thereby enabling the UE to save power (e.g., as compared to connecting to the network). Another technical advantage of process 1100 is that the UE can switch from monitoring first BWPs to monitoring second BWPs, perform operations that require a large bandwidth, such as performing and transmitting PRS measurements, and then switch back to monitoring the first BWPs, all while in the inactive state. The ability to perform large bandwidth operations, such as positioning, enables more accurate positioning (e.g., as compared to using a small bandwidth) while retaining the power savings of remaining in an inactive state.

Figure 12:
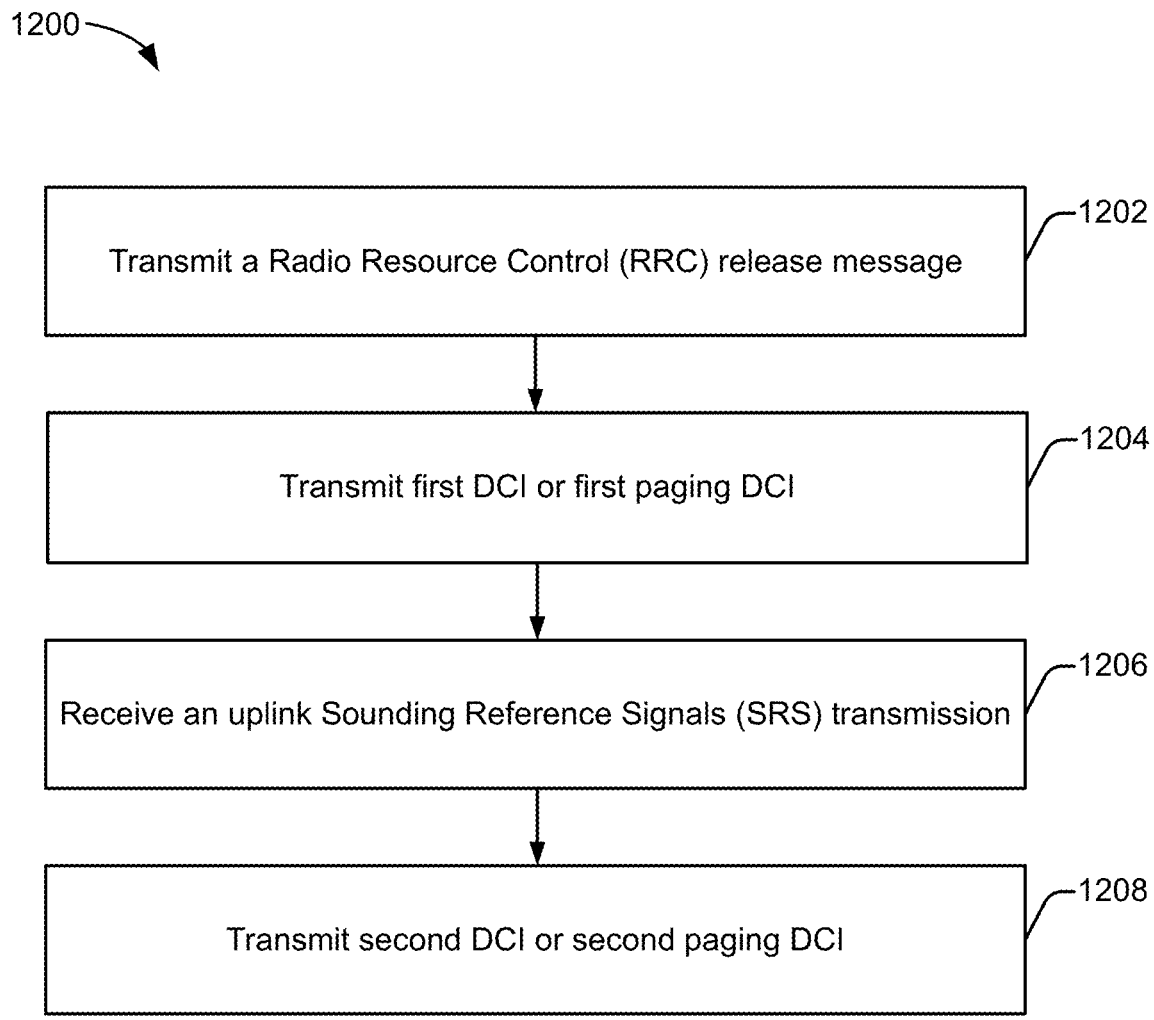
FIG. 12 illustrates an example method of wireless positioning performed by a network entity, according to aspects of the disclosure.

FIG. 12 illustrates an example method 1200 of wireless positioning, according to aspects of the disclosure. For example, the method 1200 may be performed by a network entity, such as the gNB 222.

At 1202, the network entity transmits an RRC release message (e.g., to the UE 204). The RRC release message instructs the UE 204 to enter into an RRC inactive state). In an aspect, 1202 may be performed by the one or more WWAN transceivers 350, the one or more processors 384, the positioning component 388, and/or the memory 386, any or all of which may be considered means for performing this operation.

At 1204, the network entity transmits (e.g., to the UE 204) either a first DCI or a first paging DCI. The first DCI or the first paging DCI instructs the UE 204 to switch from one or more first BWPs having a first bandwidth to one or more second BWPs having a second bandwidth (e.g., that is different than the first bandwidth). In an aspect, 1204 may be performed by the one or more WWAN transceivers 350, the one or more processors 384, the positioning component 388, and/or the memory 386, any or all of which may be considered means for performing this operation.

At 1206, the network entity receives (e.g., from the UE 204) an uplink SRS transmission. In an aspect, 1206 may be performed by the one or more WWAN transceivers 350, the one or more processors 384, the positioning component 388, and/or the memory 386, any or all of which may be considered means for performing this operation.

At 1208, the network entity transmits (e.g., to the UE 204) either a second DCI or a second paging DCI. The second DCI or the second paging DCI instructs the UE 204 to switch back from the one or more second BWPs to the one or more first BWPs. In an aspect, 1208 may be performed by the one or more WWAN transceivers 350, the one or more processors 384, the positioning component 388, and/or the memory 386, any or all of which may be considered means for performing this operation.

As will be appreciated, a technical advantage of method 1200 is that a network entity, such as the gNB, can cause a UE to remain in an RRC inactive state while the UE is monitoring different BWPs, thereby enabling the UE to save power (e.g., by not connecting to the network). Another technical advantage of method 1200 is that the network entity can control when the UE switches from monitoring first BWPs to monitoring second BWPs, performs operations that require a large bandwidth, such as performing and transmitting (e.g., using UL SRS) PRS measurements, and then switches back to monitoring the first BWPs, all while in the inactive state. The ability to perform large bandwidth operations, such as positioning, enables the network entity to receive more accurate data, thereby enabling the network entity to perform more accurate positioning (e.g., as compared to using less amounts of data transmitted over a small bandwidth) while enabling the UE to retain the power savings of remaining in an inactive state.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless positioning performed by a user equipment, comprising:
entering into a Radio Resource Control (RRC) inactive state; monitoring, during a first time interval, while the user equipment is in the RRC inactive state, one or more first bandwidth parts having a first bandwidth to perform a first operation; and monitoring, during a second time interval, while the user equipment is in the RRC inactive state, one or more second bandwidth parts having a second bandwidth to perform a second operation, wherein the second bandwidth is different than the first bandwidth.

Clause 2. The method of clause 1, wherein: the first operation comprises monitoring for downlink paging information, and the second operation comprises obtaining one or more positioning measurements of one or more positioning reference signals (PRS).

Clause 3. The method of clause 2, further comprising: transmitting the one or more positioning measurements to a network entity while the user equipment is in the RRC inactive state.

Clause 4. The method of clause 3, further comprising: receiving a confirmation message from the network entity based on transmission of the one or more positioning measurements to the network entity.

Clause 5. The method of clause 4, wherein the confirmation message from the network entity causes the user equipment to: enter into an RRC idle state, or remain in the RRC inactive state.

Clause 6. The method of any of clauses 2 to 5, further comprising: transmitting the one or more positioning measurements to a network entity while the user equipment is in an RRC active state.

Clause 7. The method of any of clauses 1 to 6, wherein: the first bandwidth is a default bandwidth for small data transmission (SDT), and the second bandwidth is a positioning bandwidth for measuring PRS.

Clause 8. The method of clause 1, wherein: the first operation comprises receiving a downlink paging message indicating the second time interval.

Clause 9. The method of clause 8, wherein: the second time interval is specified as an absolute time.

Clause 10. The method of any of clauses 8 to 9, wherein: the second time interval is specified as a relative time relative to a time that the downlink paging message is received.

Clause 11. The method of clause 1, wherein: the first operation comprises receiving Downlink Control Information (DCI) instructing the user equipment to switch from the one or more first bandwidth parts to the one or more second bandwidth parts.

Clause 12. The method of clause 11, wherein: a field in the DCI indicates at least the one or more second bandwidth parts and the second time interval.

Clause 13. The method of any of clauses 11 to 12, wherein: monitoring the one or more first bandwidth parts comprises monitoring a search space and a control resource set (CORESET) for the DCI, the DCI associated with an inactive Radio Network Temporary Identifier (I-RNTI).

Clause 14. The method of any of clauses 1 to 13, further comprising: switching from the one or more second bandwidth parts to the one or more first bandwidth parts in response to receiving Downlink Control Information (DCI) instructing the user equipment to switch from the one or more second bandwidth parts to the one or more first bandwidth parts.

Clause 15. The method of any of clauses 1 to 14, further comprising: switching from the one or more second bandwidth parts to the one or more first bandwidth parts after a configured timer expires.

Clause 16. The method of any of clauses 1 to 15, further comprising: receiving a first indication of at least the second time interval while the user equipment is in an RRC active state; and switching from the one or more first bandwidth parts to the one or more second bandwidth parts based on the first indication.

Clause 17. The method of clause 16, further comprising: receiving a second indication of at least the first time interval while the user equipment is in the RRC active state; and switching from the one or more second bandwidth parts to the one or more first bandwidth parts based on the second indication.

Clause 18. The method of any of clauses 1 to 17, wherein: the second bandwidth is larger than the first bandwidth.

Clause 19. The method of clause 1, wherein: the first operation comprises monitoring for downlink paging signals, and the second operation comprises transmitting one or more uplink Sounding Reference Signals (SRS).

Clause 20. The method of any of clauses 1 to 19, wherein monitoring the one or more first bandwidth parts comprises monitoring one or more downlink paging channels, one or more search spaces, or both.

Clause 21. A user equipment, comprising: a memory; at least one transceiver; and at least one processor communicatively coupled to the memory and the at least one transceiver, the at least one processor configured to: enter into a Radio Resource Control (RRC) inactive state; monitor, during a first time interval, while the user equipment is in the RRC inactive state, one or more first bandwidth parts having a first bandwidth to perform a first operation; and monitor, during a second time interval, while the user equipment is in the RRC inactive state, one or more second bandwidth parts having a second bandwidth to perform a second operation, wherein the second bandwidth is different than the first bandwidth.

Clause 22. The user equipment of clause 21, wherein: the first operation comprises monitoring for downlink paging information, and the second operation comprises obtaining one or more positioning measurements of one or more positioning reference signals (PRS).

Clause 23. The user equipment of clause 22, wherein the at least one processor is further configured to: transmit, via the at least one transceiver, the one or more positioning measurements to a network entity while the user equipment is in the RRC inactive state.

Clause 24. The user equipment of clause 23, wherein the at least one processor is further configured to: receive, via the at least one transceiver, a confirmation message from the network entity based on transmission of the one or more positioning measurements to the network entity.

Clause 25. The user equipment of clause 24, wherein the confirmation message from the network entity causes the user equipment to: enter into an RRC idle state, or remain in the RRC inactive state.

Clause 26. The user equipment of any of clauses 22 to 25, wherein the at least one processor is further configured to: transmit, via the at least one transceiver, the one or more positioning measurements to a network entity while the user equipment is in an RRC active state.

Clause 27. The user equipment of any of clauses 21 to 26, wherein: the first bandwidth is a default bandwidth for small data transmission (SDT), and the second bandwidth is a positioning bandwidth for measuring PRS.

Clause 28. The user equipment of clause 21, wherein: the first operation comprises receiving a downlink paging message indicating the second time interval.

Clause 29. The user equipment of clause 28, wherein: the second time interval is specified as an absolute time.

Clause 30. The user equipment of any of clauses 28 to 29, wherein: the second time interval is specified as a relative time relative to a time that the downlink paging message is received.

Clause 31. The user equipment of clause 21, wherein: the first operation comprises receiving Downlink Control Information (DCI) instructing the user equipment to switch from the one or more first bandwidth parts to the one or more second bandwidth parts.

Clause 32. The user equipment of clause 31, wherein: a field in the DCI indicates at least the one or more second bandwidth parts and the second time interval.

Clause 33. The user equipment of any of clauses 31 to 32, wherein the at least one processor configured to monitor the one or more first bandwidth parts comprises the at least one processor configured to monitor a search space and a control resource set (CORESET) for the DCI, the DCI associated with an inactive Radio Network Temporary Identifier (I-RNTI).

Clause 34. The user equipment of any of clauses 21 to 33, wherein the at least one processor is further configured to: switch from the one or more second bandwidth parts to the one or more first bandwidth parts in response to receiving Downlink Control Information (DCI) instructing the user equipment to switch from the one or more second bandwidth parts to the one or more first bandwidth parts.

Clause 35. The user equipment of any of clauses 21 to 34, wherein the at least one processor is further configured to: switch from the one or more second bandwidth parts to the one or more first bandwidth parts after a configured timer expires.

Clause 36. The user equipment of any of clauses 21 to 35, wherein the at least one processor is further configured to: receive, via the at least one transceiver, a first indication of at least the second time interval while the user equipment is in an RRC active state; and switch from the one or more first bandwidth parts to the one or more second bandwidth parts based on the first indication.

Clause 37. The user equipment of clause 36, wherein the at least one processor is further configured to: receive, via the at least one transceiver, a second indication of at least the first time interval while the user equipment is in the RRC active state; and switch from the one or more second bandwidth parts to the one or more first bandwidth parts based on the second indication.

Clause 38. The user equipment of any of clauses 21 to 37, wherein: the second bandwidth is larger than the first bandwidth.

Clause 39. The user equipment of clauses 21, wherein: the first operation comprises monitoring for downlink paging signals, and the second operation comprises transmitting one or more uplink Sounding Reference Signals (SRS).

Clause 40. The user equipment of any of clauses 21 to 39, wherein the at least one processor configured to monitor the one or more first bandwidth parts comprises the at least one processor configured to monitor one or more downlink paging channels, one or more search spaces, or both.

Clause 41. A user equipment, comprising: means for entering into a Radio Resource Control (RRC) inactive state; means for monitoring, during a first time interval, while the user equipment is in the RRC inactive state, one or more first bandwidth parts having a first bandwidth to perform a first operation; and means for monitoring, during a second time interval, while the user equipment is in the RRC inactive state, one or more second bandwidth parts having a second bandwidth to perform a second operation, wherein the second bandwidth is different than the first bandwidth.

Clause 42. The user equipment of clause 41, wherein: the first operation comprises monitoring for downlink paging information, and the second operation comprises obtaining one or more positioning measurements of one or more positioning reference signals (PRS).

Clause 43. The user equipment of clause 42, further comprising: means for transmitting the one or more positioning measurements to a network entity while the user equipment is in the RRC inactive state.

Clause 44. The user equipment of clause 43, further comprising: means for receiving a confirmation message from the network entity based on transmission of the one or more positioning measurements to the network entity.

Clause 45. The user equipment of clause 44, wherein the confirmation message from the network entity causes the user equipment to: enter into an RRC idle state, or remain in the RRC inactive state.

Clause 46. The user equipment of any of clauses 42 to 45, further comprising: means for transmitting the one or more positioning measurements to a network entity while the user equipment is in an RRC active state.

Clause 47. The user equipment of any of clauses 41 to 46, wherein: the first bandwidth is a default bandwidth for small data transmission (SDT), and the second bandwidth is a positioning bandwidth for measuring PRS.

Clause 48. The user equipment of clause 41, wherein: the first operation comprises receiving a downlink paging message indicating the second time interval.

Clause 49. The user equipment of clause 48, wherein: the second time interval is specified as an absolute time.

Clause 50. The user equipment of any of clauses 48 to 49, wherein: the second time interval is specified as a relative time relative to a time that the downlink paging message is received.

Clause 51. The user equipment of clause 41, wherein: the first operation comprises receiving Downlink Control Information (DCI) instructing the user equipment to switch from the one or more first bandwidth parts to the one or more second bandwidth parts.

Clause 52. The user equipment of clause 51, wherein: a field in the DCI indicates at least the one or more second bandwidth parts and the second time interval.

Clause 53. The user equipment of any of clauses 51 to 52, wherein: the means for monitoring the one or more first bandwidth parts comprises means for monitoring a search space and a control resource set (CORESET) for the DCI, the DCI associated with an inactive Radio Network Temporary Identifier (I-RNTI).

Clause 54. The user equipment of any of clauses 41 to 53, further comprising: means for switching from the one or more second bandwidth parts to the one or more first bandwidth parts in response to receiving Downlink Control Information (DCI) instructing the user equipment to switch from the one or more second bandwidth parts to the one or more first bandwidth parts.

Clause 55. The user equipment of any of clauses 41 to 54, further comprising: means for switching from the one or more second bandwidth parts to the one or more first bandwidth parts after a configured timer expires.

Clause 56. The user equipment of any of clauses 41 to 55, further comprising: means for receiving a first indication of at least the second time interval while the user equipment is in an RRC active state; and means for switching from the one or more first bandwidth parts to the one or more second bandwidth parts based on the first indication.

Clause 57. The user equipment of clause 56, further comprising: means for receiving a second indication of at least the first time interval while the user equipment is in the RRC active state; and means for switching from the one or more second bandwidth parts to the one or more first bandwidth parts based on the second indication.

Clause 58. The user equipment of any of clauses 41 to 57, wherein: the second bandwidth is larger than the first bandwidth.

Clause 59. The user equipment of clause 41, wherein: the first operation comprises monitoring for downlink paging signals, and the second operation comprises transmitting one or more uplink Sounding Reference Signals (SRS).

Clause 60. The user equipment of any of clauses 41 to 59, wherein the means for monitoring the one or more first bandwidth parts comprises means for monitoring one or more downlink paging channels, one or more search spaces, or both.

Clause 61. A non-transitory computer-readable medium storing computer-executable instructions that, when executed by a user equipment, cause the user equipment to: enter into a Radio Resource Control (RRC) inactive state; monitor, during a first time interval, while the user equipment is in the RRC inactive state, one or more first bandwidth parts having a first bandwidth to perform a first operation; and monitor, during a second time interval, while the user equipment is in the RRC inactive state, one or more second bandwidth parts having a second bandwidth to perform a second operation, wherein the second bandwidth is different than the first bandwidth.

Clause 62. The non-transitory computer-readable medium of clause 61, wherein: the first operation comprises monitoring for downlink paging information, and the second operation comprises obtaining one or more positioning measurements of one or more positioning reference signals (PRS).

Clause 63. The non-transitory computer-readable medium of clause 62, further comprising computer-executable instructions that, when executed by the user equipment, cause the user equipment to: transmit the one or more positioning measurements to a network entity while the user equipment is in the RRC inactive state.

Clause 64. The non-transitory computer-readable medium of clause 63, further comprising computer-executable instructions that, when executed by the user equipment, cause the user equipment to: receive a confirmation message from the network entity based on transmission of the one or more positioning measurements to the network entity.

Clause 65. The non-transitory computer-readable medium of clause 64, wherein the confirmation message from the network entity causes the user equipment to: enter into an RRC idle state, or remain in the RRC inactive state.

Clause 66. The non-transitory computer-readable medium of any of clauses 62 to 65, further comprising computer-executable instructions that, when executed by the user equipment, cause the user equipment to: transmit the one or more positioning measurements to a network entity while the user equipment is in an RRC active state.

Clause 67. The non-transitory computer-readable medium of any of clauses 61 to 66, wherein: the first bandwidth is a default bandwidth for small data transmission (SDT), and the second bandwidth is a positioning bandwidth for measuring PRS.

Clause 68. The non-transitory computer-readable medium of clause 61, wherein: the first operation comprises receiving a downlink paging message indicating the second time interval.

Clause 69. The non-transitory computer-readable medium of clause 68, wherein: the second time interval is specified as an absolute time.

Clause 70. The non-transitory computer-readable medium of any of clauses 68 to 69, wherein: the second time interval is specified as a relative time relative to a time that the downlink paging message is received.

Clause 71. The non-transitory computer-readable medium of clause 61, wherein: the first operation comprises receiving Downlink Control Information (DCI) instructing the user equipment to switch from the one or more first bandwidth parts to the one or more second bandwidth parts.

Clause 72. The non-transitory computer-readable medium of clause 71, wherein: a field in the DCI indicates at least the one or more second bandwidth parts and the second time interval.

Clause 73. The non-transitory computer-readable medium of any of clauses 71 to 72, wherein the computer-executable instructions that, when executed by the user equipment, cause the user equipment to monitor the one or more first bandwidth parts comprise computer-executable instructions that, when executed by the user equipment, cause the user equipment to monitor a search space and a control resource set (CORESET) for the DCI, the DCI associated with an inactive Radio Network Temporary Identifier (I-RNTI).

Clause 74. The non-transitory computer-readable medium of any of clauses 61 to 73, further comprising computer-executable instructions that, when executed by the user equipment, cause the user equipment to switch from the one or more second bandwidth parts to the one or more first bandwidth parts in response to receiving Downlink Control Information (DCI) instructing the user equipment to switch from the one or more second bandwidth parts to the one or more first bandwidth parts.

Clause 75. The non-transitory computer-readable medium of any of clauses 61 to 74, further comprising computer-executable instructions that, when executed by the user equipment, cause the user equipment to: switch from the one or more second bandwidth parts to the one or more first bandwidth parts after a configured timer expires.

Clause 76. The non-transitory computer-readable medium of any of clauses 61 to 75, further comprising computer-executable instructions that, when executed by the user equipment, cause the user equipment to: receive a first indication of at least the second time interval while the user equipment is in an RRC active state; and switch from the one or more first bandwidth parts to the one or more second bandwidth parts based on the first indication.

Clause 77. The non-transitory computer-readable medium of clause 76, further comprising computer-executable instructions that, when executed by the user equipment, cause the user equipment to: receive a second indication of at least the first time interval while the user equipment is in the RRC active state; and switch from the one or more second bandwidth parts to the one or more first bandwidth parts based on the second indication.

Clause 78. The non-transitory computer-readable medium of any of clauses 61 to 77, wherein: the second bandwidth is larger than the first bandwidth.

Clause 79. The non-transitory computer-readable medium of clause 61, wherein: the first operation comprises monitoring for downlink paging signals, and the second operation comprises transmitting one or more uplink Sounding Reference Signals (SRS).

Clause 80. The non-transitory computer-readable medium of any of clauses 61 to 79, wherein the computer-executable instructions that, when executed by the user equipment, cause the user equipment to monitor the one or more first bandwidth parts comprise computer-executable instructions that, when executed by the user equipment, cause the user equipment to monitor one or more downlink paging channels, one or more search spaces, or both.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless positioning performed by a user equipment, comprising:
    entering into a Radio Resource Control (RRC) inactive state;
    monitoring, during a first time interval, while the user equipment is in the RRC inactive state, one or more first bandwidth parts having a first bandwidth to perform a first operation;
    switching, after the first time interval while the user equipment remains in the RRC inactive state, from the one or more first bandwidth parts to one or more second bandwidth parts; and
    monitoring, after switching to the one or more second bandwidth parts and during a second time interval, while the user equipment is in the RRC inactive state, the one or more second bandwidth parts having a second bandwidth to perform a second operation, wherein the second bandwidth is different than the first bandwidth.

2. The method of claim 1, wherein:
    the first operation comprises monitoring for downlink paging information, and
    the second operation comprises obtaining one or more positioning measurements of one or more positioning reference signals (PRS).

3. The method of claim 2, further comprising:
    transmitting the one or more positioning measurements to a network entity while the user equipment is in the RRC inactive state.

4. The method of claim 3, further comprising:
    receiving a confirmation message from the network entity based on transmission of the one or more positioning measurements to the network entity.

5. The method of claim 4, wherein the confirmation message from the network entity causes the user equipment to:
    enter into an RRC idle state, or
    remain in the RRC inactive state.

6. The method of claim 2, further comprising:
    transmitting the one or more positioning measurements to a network entity while the user equipment is in an RRC active state.

7. The method of claim 1, wherein:
    the first bandwidth is a default bandwidth for small data transmission (SDT), and
    the second bandwidth is a positioning bandwidth for measuring PRS.

8. The method of claim 1, wherein:
    the first operation comprises receiving a downlink paging message indicating the second time interval.

9. The method of claim 8, wherein:
    the second time interval is specified as an absolute time.

10. The method of claim 8, wherein:
    the second time interval is specified as a relative time relative to a time that the downlink paging message is received.

11. The method of claim 1, wherein:
    the first operation comprises receiving Downlink Control Information (DCI) instructing the user equipment to switch from the one or more first bandwidth parts to the one or more second bandwidth parts.

12. The method of claim 11, wherein:
a field in the DCI indicates at least the one or more second bandwidth parts and the second time interval.

13. The method of claim 11, wherein:
monitoring the one or more first bandwidth parts comprises monitoring a search space and a control resource set (CORESET) for the DCI, the DCI associated with an inactive Radio Network Temporary Identifier (I-RNTI).

14. The method of claim 1, further comprising:
switching from the one or more second bandwidth parts to the one or more first bandwidth parts in response to receiving Downlink Control Information (DCI) instructing the user equipment to switch from the one or more second bandwidth parts to the one or more first bandwidth parts.

15. The method of claim 1, further comprising:
switching from the one or more second bandwidth parts to the one or more first bandwidth parts after a configured timer expires.

16. The method of claim 1, further comprising:
receiving a first indication of at least the second time interval while the user equipment is in an RRC active state,
wherein the switching from the one or more first bandwidth parts to the one or more second bandwidth parts is based on the first indication.

17. The method of claim 16, further comprising:
receiving a second indication of at least the first time interval while the user equipment is in the RRC active state; and
switching from the one or more second bandwidth parts to the one or more first bandwidth parts based on the second indication.

18. The method of claim 1, wherein:
the second bandwidth is larger than the first bandwidth.

19. The method of claim 1, wherein:
the first operation comprises monitoring for downlink paging signals, and
the second operation comprises transmitting one or more uplink Sounding Reference Signals (SRS).

20. The method of claim 1, wherein monitoring the one or more first bandwidth parts comprises monitoring one or more downlink paging channels, one or more search spaces, or both.

21. A user equipment, comprising:
a memory;
at least one transceiver; and
at least one processor communicatively coupled to the memory and the at least one transceiver, the at least one processor configured to:
enter into a Radio Resource Control (RRC) inactive state;
monitor, during a first time interval, while the user equipment is in the RRC inactive state, one or more first bandwidth parts having a first bandwidth to perform a first operation;
switch, after the first time interval while the user equipment remains in the RRC inactive state, from the one or more first bandwidth parts to one or more second bandwidth parts; and
monitor, after switching to the one or more second bandwidth parts and during a second time interval, while the user equipment is in the RRC inactive state, the one or more second bandwidth parts having a second bandwidth to perform a second operation, wherein the second bandwidth is different than the first bandwidth.

22. The user equipment of claim 21, wherein:
the first operation comprises monitoring for downlink paging information, and
the second operation comprises obtaining one or more positioning measurements of one or more positioning reference signals (PRS).

23. The user equipment of claim 21, wherein:
the first bandwidth is a default bandwidth for small data transmission (SDT), and
the second bandwidth is a positioning bandwidth for measuring PRS.

24. The user equipment of claim 21, wherein:
the first operation comprises receiving Downlink Control Information (DCI) instructing the user equipment to switch from the one or more first bandwidth parts to the one or more second bandwidth parts.

25. The user equipment of claim 21, wherein the at least one processor is further configured to
switch from the one or more second bandwidth parts to the one or more first bandwidth parts in response to receiving Downlink Control Information (DCI) instructing the user equipment to switch from the one or more second bandwidth parts to the one or more first bandwidth parts.

26. The user equipment of claim 21, wherein the at least one processor is further configured to:
switch from the one or more second bandwidth parts to the one or more first bandwidth parts after a configured timer expires.

27. The user equipment of claim 21, wherein:
the second bandwidth is larger than the first bandwidth.

28. The user equipment of claim 21, wherein:
the first operation comprises monitoring for downlink paging signals, and
the second operation comprises transmitting one or more uplink Sounding Reference Signals (SRS).

29. A user equipment, comprising:
means for entering into a Radio Resource Control (RRC) inactive state;
means for monitoring, during a first time interval, while the user equipment is in the RRC inactive state, one or more first bandwidth parts having a first bandwidth to perform a first operation;
means for switching, after the first time interval while the user equipment remains in the RRC inactive state, from the one or more first bandwidth parts to one or more second bandwidth parts; and
means for monitoring, after switching to the one or more second bandwidth parts and during a second time interval, while the user equipment is in the RRC inactive state, the one or more second bandwidth parts having a second bandwidth to perform a second operation, wherein the second bandwidth is different than the first bandwidth.

30. A non-transitory computer-readable medium storing computer-executable instructions that, when executed by a user equipment, cause the user equipment to:
enter into a Radio Resource Control (RRC) inactive state;
monitor, during a first time interval, while the user equipment is in the RRC inactive state, one or more first bandwidth parts having a first bandwidth to perform a first operation;

switch, after the first time interval while the user equipment remains in the RRC inactive state, from the one or more first bandwidth parts to one or more second bandwidth parts; and monitor, after switching to the one or more second bandwidth parts and during a second time interval, while the user equipment is in the RRC inactive state, the one or more second bandwidth parts having a second bandwidth to perform a second operation, wherein the second bandwidth is different than the first bandwidth.

* * * * *